(12) United States Patent
Watanabe et al.

(10) Patent No.: US 8,582,403 B2
(45) Date of Patent: Nov. 12, 2013

(54) OPTICAL DISC APPARATUS AND METHOD OF MAKING LAYER-TO-LAYER JUMP IN MULTILAYER OPTICAL DISC

(75) Inventors: Katsuya Watanabe, Ehime (JP); Shinichi Yamamoto, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/996,664

(22) PCT Filed: Mar. 24, 2010

(86) PCT No.: PCT/JP2010/002050
§ 371 (c)(1),
(2), (4) Date: Dec. 7, 2010

(87) PCT Pub. No.: WO2010/116632
PCT Pub. Date: Oct. 14, 2010

(65) Prior Publication Data
US 2011/0080814 A1  Apr. 7, 2011

(30) Foreign Application Priority Data
Apr. 10, 2009  (JP) .................................. 2009-095849

(51) Int. Cl.
*G11B 7/00* (2006.01)
*G11B 11/00* (2006.01)

(52) U.S. Cl.
USPC ..................................... 369/44.28; 369/13.39

(58) Field of Classification Search
None
See application file for complete search history.

(56) References Cited

U.S. PATENT DOCUMENTS

| | | | |
|---|---|---|---|
| 2003/0007431 A1* | 1/2003 | Tateishi | 369/44.23 |
| 2007/0171781 A1 | 7/2007 | Imai et al. | |
| 2008/0151730 A1* | 6/2008 | Kikukawa et al. | 369/94 |
| 2010/0118685 A1* | 5/2010 | Komma et al. | 369/112.23 |
| 2011/0080814 A1* | 4/2011 | Watanabe et al. | 369/44.14 |

FOREIGN PATENT DOCUMENTS

| | | |
|---|---|---|
| JP | 11-345420 A | 12/1999 |
| JP | 2003-016660 A | 1/2003 |
| JP | 2003-022545 A | 1/2003 |
| JP | 2007-109285 A | 4/2007 |
| JP | 2007-200447 A | 8/2007 |

OTHER PUBLICATIONS

International Search Report for corresponding International Application No. PCT/JP2010/002050 mailed Apr. 27, 2010.
Form PCT-ISA-237 for corresponding International Application No. PCT/JP2010/002050 dated Apr. 27, 2010 and partial English translation.

* cited by examiner

*Primary Examiner* — Joseph Feild
*Assistant Examiner* — Carl Adams
(74) *Attorney, Agent, or Firm* — Renner, Otto, Boisselle & Sklar, LLP

(57) ABSTRACT

A layer-to-layer jumping method according to the present invention includes, after a layer-to-layer jump has been started in a multilayer optical disc, the step ST7 of detecting an S-curve signal from an information layer, which is located shallower than the target information layer of the layer-to-layer jump, with a spherical aberration correction made adaptively to that shallower information layer, and the step ST8 of generating a deceleration signal based on the S-curve signal detected to get the layer-to-layer jump done.

18 Claims, 19 Drawing Sheets

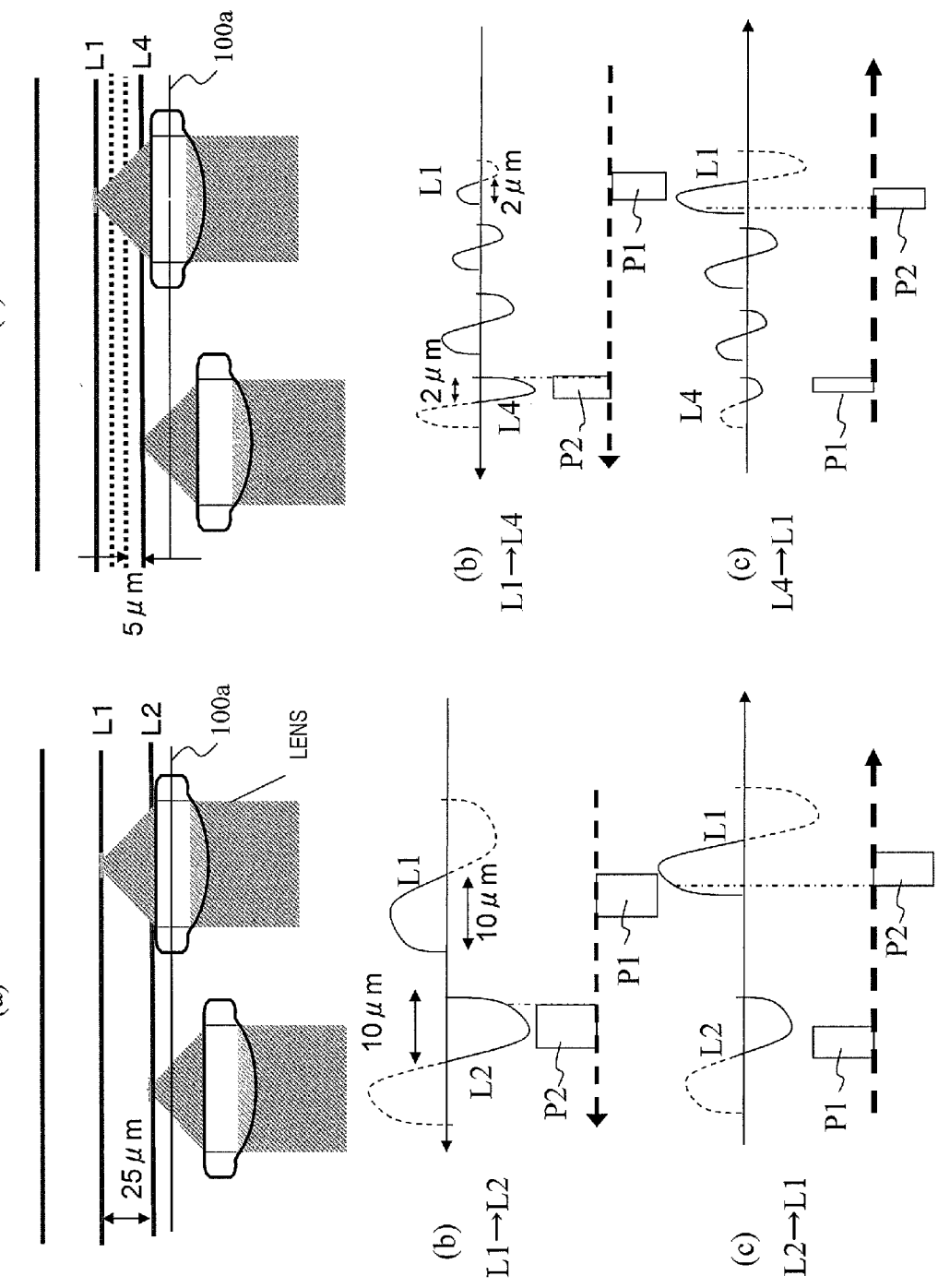

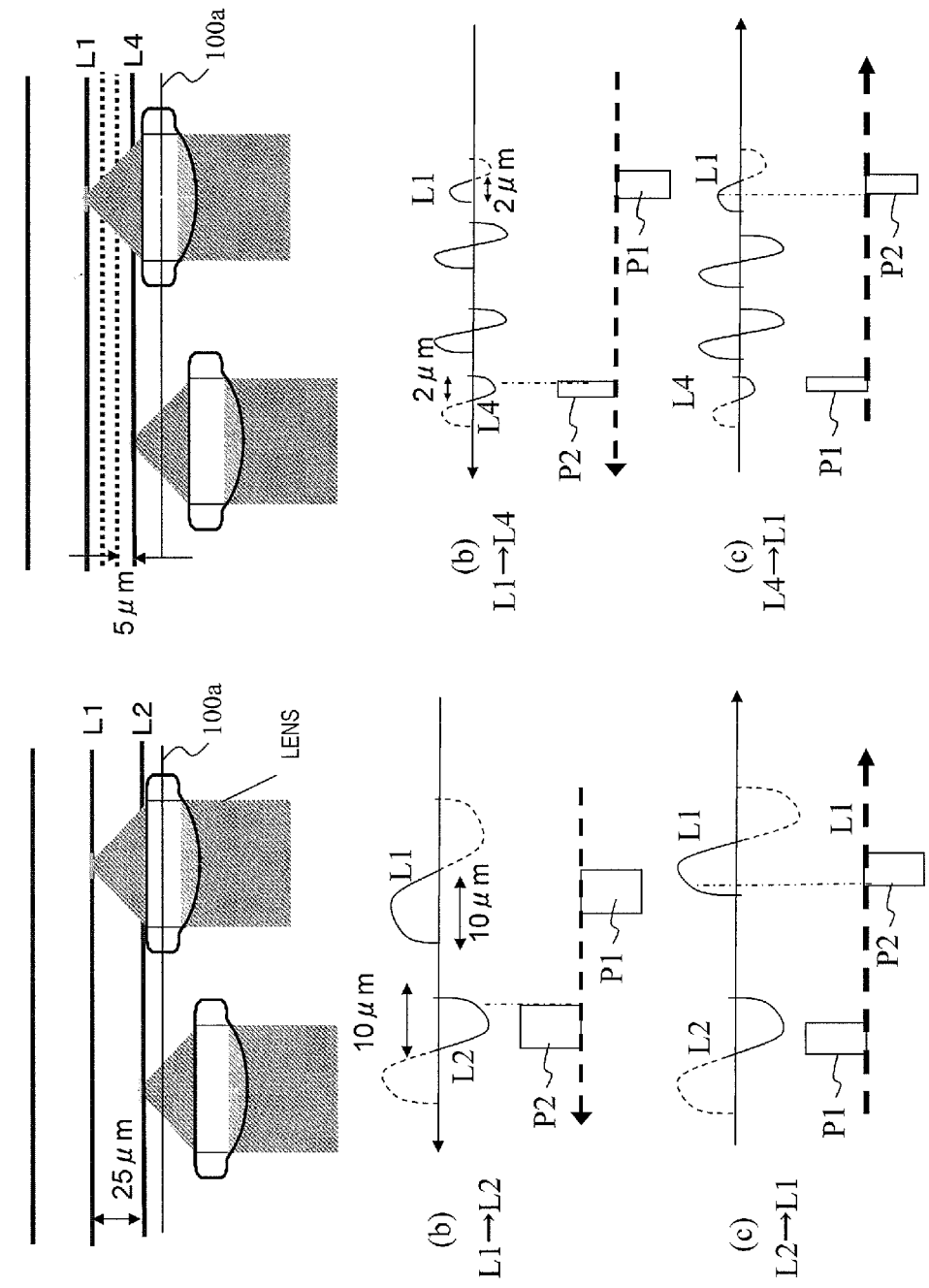

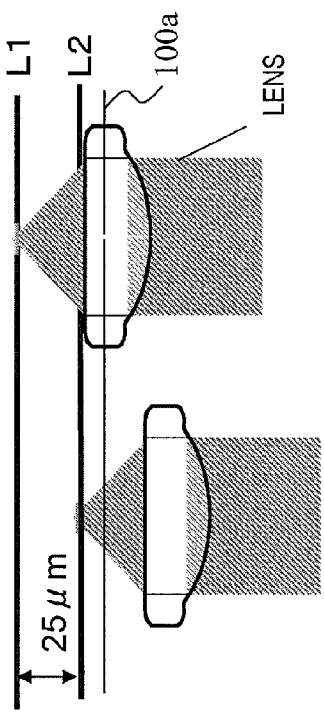
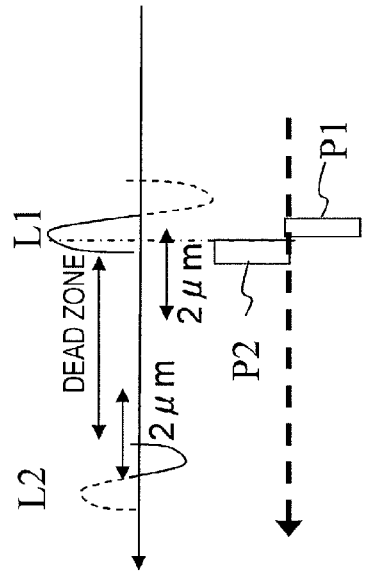
FIG.5
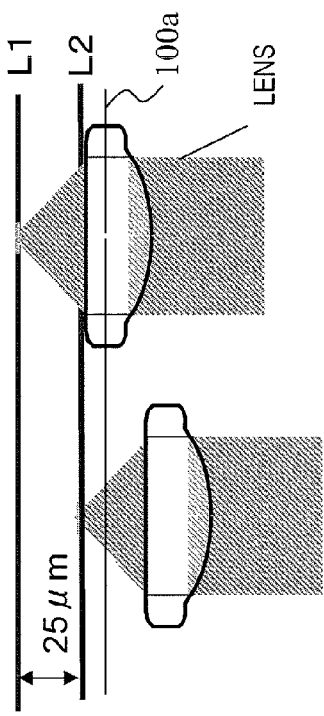
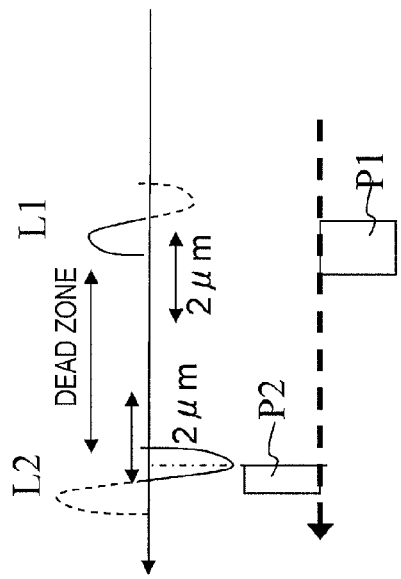
FIG.6

FIG. 8

| GROUP 0 LP=25 | | GROUP 1 LP=10 | | GROUP 2 LP=6.25 | | GROUP 3 LP=5 | |
|---|---|---|---|---|---|---|---|
| DUAL-LAYER BD | | FOUR-LAYER BD | | SIX-LAYER AND EIGHT-LAYER BDs | | TEN-LAYER TO SIXTEEN-LAYER BDs | |
| 1 | 100 | 1 | 100 | 1 | 100 | 1 | 100 |
| 2 | 75 | 2 | 90 | 2 | 93.75 | 2 | 95 |
| | | 3 | 80 | 3 | 87.5 | 3 | 90 |
| | | 4 | 70 | 4 | 81.25 | 4 | 85 |
| | | | | 5 | 75 | 5 | 80 |
| | | | | 6 | 68.75 | 6 | 75 |
| | | | | 7 | 62.5 | 7 | 70 |
| | | | | 8 | 56.25 | 8 | 65 |
| | | | | | | 9 | 60 |
| | | | | | | 10 | 55 |
| | | | | | | 11 | 50 |
| | | | | | | 12 | 45 |
| | | | | | | 13 | 40 |
| | | | | | | 14 | 35 |
| | | | | | | 15 | 30 |
| | | | | | | 16 | 25 |

FIG.9

| GROUP 0 LP=25 | | GROUP 1 LP=8 AND 10 | | GROUP 2 LP=5.75 AND 6.25 | | GROUP 3 LP=4 AND 5 | |
|---|---|---|---|---|---|---|---|
| DUAL-LAYER BD | | FOUR-LAYER BD | | SIX-LAYER AND EIGHT-LAYER BDs | | TEN-LAYER TO SIXTEEN-LAYER BDs | |
| 1 | 100 | 1 | 100 | 1 | 100 | 1 | 100 |
| 2 | 75 | 2 | 90 | 2 | 93.75 | 2 | 95 |
| | | 3 | 82 | 3 | 88 | 3 | 91 |
| | | 4 | 72 | 4 | 81.75 | 4 | 86 |
| | | | | 5 | 76 | 5 | 82 |
| | | | | 6 | 69.75 | 6 | 77 |
| | | | | 7 | 64 | 7 | 73 |
| | | | | 8 | 57.75 | 8 | 68 |
| | | | | | | 9 | 64 |
| | | | | | | 10 | 59 |
| | | | | | | 11 | 55 |
| | | | | | | 12 | 50 |
| | | | | | | 13 | 46 |
| | | | | | | 14 | 41 |
| | | | | | | 15 | 37 |
| | | | | | | 16 | 32 |

FIG.10

| GROUP 0 | LP=25 | GROUP 1 | LP=12.5 | GROUP 2 | LP=6.25 | GROUP 3 | LP=3.125 |
|---|---|---|---|---|---|---|---|
| DUAL-LAYER BD | | FOUR-LAYER BD | | SIX-LAYER AND EIGHT-LAYER BDs | | TEN-LAYER TO SIXTEEN-LAYER BDs | |
| 1 | 100 | 1 | 100 | 1 | 100 | 1 | 100 |
| 2 | 75 | 2 | 87.5 | 2 | 93.75 | 2 | 96.875 |
| | | 3 | 75 | 3 | 87.5 | 3 | 93.75 |
| | | 4 | 62.5 | 4 | 81.25 | 4 | 90.625 |
| | | | | 5 | 75 | 5 | 87.5 |
| | | | | 6 | 68.75 | 6 | 84.375 |
| | | | | 7 | 62.5 | 7 | 81.25 |
| | | | | 8 | 56.25 | 8 | 78.125 |
| | | | | | | 9 | 75 |
| | | | | | | 10 | 71.875 |
| | | | | | | 11 | 68.75 |
| | | | | | | 12 | 65.625 |
| | | | | | | 13 | 62.5 |
| | | | | | | 14 | 59.375 |
| | | | | | | 15 | 56.25 |
| | | | | | | 16 | 53.125 |

FIG.11

| GROUP 0 LP=25 DUAL-LAYER BD | | GROUP 1 LP=10 AND 12.5 FOUR-LAYER BD | | GROUP 2 LP=6 AND 6.25 SIX-LAYER AND EIGHT-LAYER BDs | | GROUP 3 LP=3 AND 3.125 TEN-LAYER TO SIXTEEN-LAYER BDs | |
|---|---|---|---|---|---|---|---|
| 1 | 100 | 1 | 100 | 1 | 100 | 1 | 100 |
| 2 | 75 | 2 | 87.5 | 2 | 93.75 | 2 | 96.875 |
| | | 3 | 77.5 | 3 | 87.75 | 3 | 93.875 |
| | | 4 | 65 | 4 | 81.5 | 4 | 90.75 |
| | | | | 5 | 75.5 | 5 | 87.75 |
| | | | | 6 | 69.25 | 6 | 84.625 |
| | | | | 7 | 63.25 | 7 | 81.625 |
| | | | | 8 | 57 | 8 | 78.5 |
| | | | | | | 9 | 75.5 |
| | | | | | | 10 | 72.375 |
| | | | | | | 11 | 69.375 |
| | | | | | | 12 | 66.25 |
| | | | | | | 13 | 63.25 |
| | | | | | | 14 | 60.125 |
| | | | | | | 15 | 57.125 |
| | | | | | | 16 | 54 |

FIG.17

| DUAL-LAYER BD (N TO F) SHIFTING PATTERN | DISTANCE TO GO | BRAKING LAYER | MAXIMUM NUMBER OF LAYERS TO JUMP AT A TIME | NUMBER OF TIMES OF JUMPS TO MAKE | | DUAL-LAYER BD (F TO N) SHIFTING PATTERN | DISTANCE TO GO | BRAKING LAYER | MAXIMUM NUMBER OF LAYERS TO JUMP AT A TIME | NUMBER OF TIMES OF JUMPS TO MAKE |
|---|---|---|---|---|---|---|---|---|---|---|
| L1→L2 | LP=25 | L2N(MIDDLE) | 1 | 1 | | L2→L1 | 25 | L1F(MIDDLE) | 1 | 1 |

| FOUR-LAYER BD (N TO F) SHIFTING PATTERN | | DISTANCE TO GO | BRAKING LAYER | MAXIMUM NUMBER OF LAYERS TO JUMP AT A TIME | NUMBER OF TIMES OF JUMPS TO MAKE | | FOUR-LAYER BD (F TO N) SHIFTING PATTERN | | DISTANCE TO GO | BRAKING LAYER | MAXIMUM NUMBER OF LAYERS TO JUMP AT A TIME | NUMBER OF TIMES OF JUMPS TO MAKE |
|---|---|---|---|---|---|---|---|---|---|---|---|---|
| L1→L2 | | 10 | L2N(MIDDLE) | 1 | 1 | | L2→L1 | | 10 | L1F(MIDDLE) | 1 | 1 |
| L1→L3 | | 20 | L2Z | 2 | 1 | | L3→L1 | | 20 | L2Z | 2 | 1 |
| L1→L4 | | 30 | L3N | 3 | 1 | | L4→L1 | | 30 | L3N | 3 | 1 |
| L2→L3 | | 10 | L3N(MIDDLE) | 1 | 1 | | L3→L2 | | 10 | L2F(MIDDLE) | 1 | 1 |
| L2→L4 | | 20 | L3Z | 2 | 1 | | L4→L2 | | 20 | L3Z | 2 | 1 |
| L3→L4 | | 10 | L4N(MIDDLE) | 1 | 1 | | L4→L3 | | 10 | L3F(MIDDLE) | 1 | 1 |

| EIGHT-LAYER BD (N TO F) SHIFTING PATTERN | | DISTANCE TO GO | BRAKING LAYER | MAXIMUM NUMBER OF LAYERS TO JUMP AT A TIME | NUMBER OF TIMES OF JUMPS TO MAKE | | EIGHT-LAYER BD (F TO N) SHIFTING PATTERN | | DISTANCE TO GO | BRAKING LAYER | MAXIMUM NUMBER OF LAYERS TO JUMP AT A TIME | NUMBER OF TIMES OF JUMPS TO MAKE |
|---|---|---|---|---|---|---|---|---|---|---|---|---|
| L1→L2 | | 6.25 | L2N(MIDDLE) | 1 | 1 | | L2→L1 | | 6.25 | L1F(MIDDLE) | 1 | 1 |
| L1→L3 | | 12.50 | L2Z | 2 | 1 | | L3→L1 | | 12.50 | L2Z | 2 | 1 |
| L1→L4 | | 18.75 | L3N | 3 | 1 | | L4→L1 | | 18.75 | L3N | 3 | 1 |
| L1→L5 | | 25.00 | L3Z | 4 | 1 | | L5→L1 | | 25.00 | L3Z | 4 | 1 |
| L1→L6 | L1>L4>L6 | 31.25 | L3N, L5Z | 3 | 2 | | L6→L1 | L6>L4>L1 | 31.25 | L5Z, L3N | 3 | 2 |
| L1→L7 | L1>L4>L7 | 37.50 | L3N, L6Z | 3 | 2 | | L7→L1 | L7>L4>L1 | 37.50 | L5N, L3N | 3 | 2 |
| L1→L8 | L1>L5>L8 | 43.75 | L3Z, L7Z | 4 | 2 | | L8→L1 | L8>L5>L1 | 43.75 | L6Z, L3Z | 4 | 2 |
| L2→L3 | | 6.25 | L3N(MIDDLE) | 1 | 1 | | L3→L2 | | 6.25 | L2F(MIDDLE) | 1 | 1 |
| L2→L4 | | 12.50 | L3Z | 2 | 1 | | L4→L2 | | 12.50 | L3Z | 2 | 1 |
| L2→L5 | | 18.75 | L4N | 3 | 1 | | L5→L2 | | 18.75 | L4N | 3 | 1 |
| L2→L6 | | 25.00 | L4Z | 4 | 1 | | L6→L2 | | 25.00 | L4Z | 4 | 1 |
| L2→L7 | L2>L5>L7 | 31.25 | L4N, L6Z | 3 | 2 | | L7→L2 | L7>L5>L2 | 31.25 | L6Z, L4N | 3 | 2 |
| L2→L8 | L2>L5>L8 | 37.50 | L4N, L7N | 3 | 2 | | L8→L2 | L8>L5>L2 | 37.50 | L7N, L4N | 3 | 2 |
| L3→L4 | | 6.25 | L4N(MIDDLE) | 1 | 1 | | L4→L3 | | 6.25 | L3F(MIDDLE) | 1 | 1 |
| L3→L5 | | 12.50 | L4Z | 2 | 1 | | L5→L3 | | 12.50 | L4Z | 2 | 1 |
| L3→L6 | | 18.75 | L5N | 3 | 1 | | L6→L3 | | 18.75 | L5N | 3 | 1 |
| L3→L7 | | 25.00 | L5Z | 4 | 1 | | L7→L3 | | 25.00 | L5Z | 4 | 1 |
| L3→L8 | L3>L6>L8 | 31.25 | L5N, L7Z | 3 | 2 | | L8→L3 | L8>L6>L3 | 31.25 | L7Z, L5N | 3 | 2 |
| L4→L5 | | 6.25 | L5N(MIDDLE) | 1 | 1 | | L5→L4 | | 6.25 | L4F(MIDDLE) | 1 | 1 |
| L4→L6 | | 12.50 | L5Z | 2 | 1 | | L6→L4 | | 12.50 | L5Z | 2 | 1 |
| L4→L7 | | 18.75 | L6N | 3 | 1 | | L7→L4 | | 18.75 | L6N | 3 | 1 |
| L4→L8 | | 25.00 | L6N | 4 | 1 | | L8→L4 | | 25.00 | L6N | 4 | 1 |
| L5→L6 | | 6.25 | L6N(MIDDLE) | 1 | 1 | | L6→L5 | | 6.25 | L5F(MIDDLE) | 1 | 1 |
| L5→L7 | | 12.50 | L6Z | 2 | 1 | | L7→L5 | | 12.50 | L6Z | 2 | 1 |
| L5→L8 | | 18.75 | L7N | 3 | 1 | | L8→L5 | | 18.75 | L7N | 3 | 1 |
| L6→L7 | | 6.25 | L7N(MIDDLE) | 1 | 1 | | L7→L6 | | 6.25 | L6(MIDDLE) | 1 | 1 |
| L6→L8 | | 12.50 | L7Z | 2 | 1 | | L8→L6 | | 12.50 | L7Z | 2 | 1 |
| L7→L8 | | 6.25 | L7N(MIDDLE) | 1 | 1 | | L8→L7 | | 6.25 | L7N(MIDDLE) | 1 | 1 |

FIG. 18

| SIXTEEN-LAYER BD (N TO F) SHIFTING PATTERN | SIXTEEN-LAYER BD (N TO F) SHIFTING PATTERN | DISTANCE TO GO | BRAKING LAYER | MAXIMUM NUMBER OF LAYERS TO JUMP AT A TIME | NUMBER OF TIMES OF JUMPS TO MAKE | SIXTEEN-LAYER BD (N TO F) SHIFTING PATTERN | SIXTEEN-LAYER BD (N TO F) SHIFTING PATTERN | DISTANCE TO GO | BRAKING LAYER | MAXIMUM NUMBER OF LAYERS TO JUMP AT A TIME | NUMBER OF TIMES OF JUMPS TO MAKE |
|---|---|---|---|---|---|---|---|---|---|---|---|
| L1→L2 |  | 5.00 | L2N(MIDDLE) | 1 | 1 | L2→L1 |  | 5.00 | L1F(MIDDLE) | 1 | 1 |
| L1→L3 |  | 10.00 | L2Z | 2 | 1 | L3→L1 |  | 10.00 | L2Z | 2 | 1 |
| L1→L4 |  | 15.00 | L3N | 3 | 1 | L4→L1 |  | 15.00 | L2Z | 3 | 1 |
| L1→L5 |  | 20.00 | L3Z | 4 | 1 | L5→L1 |  | 20.00 | L2Z | 1 | 1 |
| L1→L6 |  | 25.00 | L4N | 5 | 1 | L6→L1 |  | 25.00 | L2Z | 2 | 1 |
| L1→L7 | L1>L6>L7 | 30.00 | L4Z, L7N | 5 | 2 | L7→L1 | L7>L2>L1 | 30.00 | L3Z, L1F | 3 | 2 |
| L1→L8 | L1>L6>L8 | 35.00 | L4Z, L7Z | 5 | 2 | L8→L1 | L8>L3>L1 | 35.00 | L4Z, L2Z | 4 | 2 |
| L1→L9 | L1>L6>L9 | 40.00 | L4Z, L8N | 5 | 2 | L9→L1 | L9>L4>L1 | 40.00 | L5Z, L2Z | 5 | 2 |
| L1→L10 | L1>L6>L10 | 45.00 | L4Z, L8Z | 5 | 2 | L10→L1 | L10>L5>L1 | 45.00 | L6Z, L2Z | 5 | 2 |
| L1→L11 | L1>L6>L11 | 50.00 | L4Z, L9N | 5 | 2 | L11→L1 | L11>L6>L1 | 50.00 | L7Z, L2Z | 5 | 2 |
| L1→L12 | L1>L6>L11>L12 | 55.00 | L4Z, L9Z, L12N | 5 | 3 | L12→L1 | L12>L7>L2>L1 | 55.00 | L8Z, L3Z, L1F | 5 | 2 |
| L1→L13 | L1>L6>L12>L13 | 60.00 | L4Z, L9Z, L13N | 5 | 3 | L13→L1 | L13>L8>L3>L1 | 60.00 | L9Z, L4Z, L2Z | 5 | 2 |
| L1→L14 | L1>L6>L12>L14 | 65.00 | L4Z, L9Z, L13Z | 5 | 3 | L14→L1 | L14>L9>L4>L1 | 65.00 | L10Z, L5Z, L2Z | 5 | 2 |
| L1→L15 | L1>L6>L12>L15 | 70.00 | L4Z, L9Z, L14N | 5 | 3 | L15→L1 | L15>L10>L5>L1 | 70.00 | L11Z, L6Z, L2Z | 5 | 2 |
| L2→L3 |  | 5.00 | L3N(MIDDLE) | 5 | 3 | L3→L2 |  | 5.00 | L2F(MIDDLE) | 5 | 3 |
| L2→L4 |  | 10.00 | L3Z | 5 | 3 | L2→L4 |  | 10.00 | L3Z | 5 | 3 |
| ⋮ | ⋮ | ⋮ | ⋮ |  |  | ⋮ | ⋮ | ⋮ | ⋮ |  |  |

OPTICAL DISC APPARATUS AND METHOD OF MAKING LAYER-TO-LAYER JUMP IN MULTILAYER OPTICAL DISC

TECHNICAL FIELD

The present invention relates to a single-sided multilayer optical disc recorder/player. More particularly, the present invention relates to an optical disc apparatus that can read from, and write to, a multilayer optical disc with as many as 16 or 20 data layers by activating a blue-violet laser source at 405 nm and at as high an NA as 0.85 or more. The present invention also relates to how to make a layer-to-layer jump (i.e., how to change data layers to read from or write to) in such a multilayer optical disc.

BACKGROUND ART

In this description, an optical disc with a stack of N information layers (where N is an integer that is equal to or greater than two) will be referred to herein as an "N-layer disc". Also, optical discs, each having multiple information layers, will be collectively referred to herein as "multilayer optical discs". A "single-sided multilayer optical disc" refers herein to an optical disc, of which each of multiple information layers is irradiated with a light beam that has come through only one side of the optical disc.

In a multilayer optical disc, the distance as measured from its disc surface 100a, through which the incoming light enters the disc, to any of its information layers is sometimes called the "depth" of that information layer. Also provided between the shallowest information layer of a multilayer optical disc and its disc surface 100a is a transparent cover layer, which is often called a "light-transmissive layer". Even though actually there is a light-transmitting layer between each pair of information layers, the distance from the disc surface 100a to an information layer of interest (i.e., the depth of that information layer) will be sometimes referred to herein as the "thickness of the light-transmissive layer".

Also, in this description, the information layer that is located most distant from the disc surface 100a of an N-layer disc will be referred to herein as an "L1 layer". And N information layers will be sequentially referred to herein as "L1 layer", "L2 layer" ... and "LN layer", respectively, in the descending order of their distance from the disc surface 100a. In that case, in a four-layer disc, for example, the information layer that is located closest to (i.e., least distant from) the disc surface 100a is L4 layer.

In optical disc technologies, data can be read out from a rotating optical disc by irradiating the disc with a relatively weak light beam with a constant intensity, and detecting the light that has been modulated by, and reflected from, the optical disc. On a read-only optical disc, information is already stored as pits that are arranged spirally during the manufacturing process of the optical disc. On the other hand, on a rewritable optical disc, a recording material film, from/on which data can be read and written optically, is deposited by evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

In a multilayer optical disc, when data is going to be read from, or written on, one of its multiple information layers stacked there (which will be referred to herein as "Layer A"), the light beam is focused on that Layer A. And when it is necessary to read or write data from/on another one of the information layers (which will be referred to herein as "Layer B"), the light beam is focused on that Layer B instead. To shift the focus position of the light beam from one information layer (i.e., a current layer) to another information layer (i.e., a target layer) in this manner will be referred to herein as a "layer change" or a "focus jump".

The focus position of a light beam can be shifted in the depth direction of the information layers (i.e., in the thickness direction of the optical disc) by a focus actuator in an optical pickup, which includes a laser light source that emits the light beam, an objective lens to converge that light beam, and actuators to move the objective lens. The actuators include a tracking actuator for moving the objective lens in the radial direction of the optical disc and a focus actuator for moving the objective lens in the thickness direction of the optical disc.

To get a focus jump (which will also be referred to herein as a "layer-to-layer jump") done, the focus position of the light beam needs to be shifted to its target position as quickly as possible by the focus actuator. For example, Patent Document No. 1 discloses a conventional technique for making such a focus jump on a dual-layer DVD or on a dual-layer Blu-ray Disc (BD).

According to a focus jump method for a dual-layer BD as disclosed in Patent Document No. 1, first of all, a spherical aberration correcting mechanism starts to be moved, and then a focus actuator will start to move an objective lens in a predetermined amount of time, which is approximately a half as long as the time it takes to move the spherical aberration correcting mechanism from a position associated with a first storage layer to a position associated with a second storage layer. That is to say, the focus actuator starts moving the objective lens while the spherical aberration correcting mechanism is approaching the position associated with the second storage layer. That is why when the focus position reaches the second storage layer, the spherical aberration correcting mechanism will also be on the verge of arriving at the position associated with the second storage layer. Consequently, a focus servo operation can be done properly on the second storage layer. According to another focus jump method, the focus position starts to be moved when the spherical aberration correcting mechanism reaches roughly a midpoint between the respective positions associated with the first and second storage layers. Thus, a focus servo operation can be performed properly after the focus position has reached the second storage layer.

According to the technique disclosed in Patent Document No. 1, if a focus jump operation needs to be performed (i.e., if a focus position needs to be shifted) by jumping two or more layers at a time in a multilayer optical disc with three or more information layers, the spherical aberration correcting mechanism and the focus actuator are moved from their positions associated with the current storage layer to their positions associated with an adjacent storage layer and the focus is once set on the adjacent storage layer. Next, a focus jump operation is performed in the same way to shift the focus position to the next adjacent storage layer. And by performing such a layer-by-layer focus jump to the adjacent storage layer a predetermined number of times, the focus position can still be shifted from one layer to another without losing the stability of the focus servo operation even if two or more storage layers should be jumped to get to the end point.

CITATION LIST

Patent Literature

Patent Document No. 1: Japanese Patent Application Laid-Open Publication No. 2003-22545

SUMMARY OF INVENTION

Technical Problem

The conventional layer-to-layer jumping technique was developed so as to be applied to a dual-layer disc. According to such a conventional layer-to-layer jumping technique, the spherical aberration is adjusted to the cover layer thickness of the target layer (i.e., the depth of the target layer) before the focus jump operation is actually started. According to another conventional technique, the magnitude of spherical aberration correction to make is adjusted in advance to an intermediate value between the target layer's and the current layer's, the light beam is defocused from the current layer, and then the focus position starts to be shifted toward the target layer.

FIGS. 1 and 2 illustrate how the light beam is focused on a dual-layer or four-layer disc and how the FE signal and drive signal vary their waveforms in a situation where the spherical aberration correction is made so as to minimize the spherical aberration at the target layer at the time of a focus jump.

Portion (a) of FIG. 1 illustrates a cross section of a dual-layer BD. Specifically, on the right-hand side of portion (a) of FIG. 1, illustrated schematically is a situation where the focus is set on the L1 layer. And on the left-hand side of portion (a) of FIG. 1, illustrated schematically is a situation where the focus is set on the L2 layer. In this case, the focus position is shifted by moving an objective lens in the thickness direction of the optical disc. Portion (b) of FIG. 1 illustrates the waveforms of S-curve signals and an acceleration pulse P1 and a deceleration pulse P2 on a focus drive signal in a situation where the focus position is shifted from the L1 layer to the L2 layer. And portion (c) of FIG. 1 illustrates the waveforms of S-curve signals and an acceleration pulse P1 and a deceleration pulse P2 on a focus drive signal in a situation where the focus position is shifted from the L2 layer to the L1 layer.

As used herein, an "S-curve signal" is a waveform portion, which appears on the FE signal when the focus position approaches an information layer and then passes through and goes beyond that information layer. When the focus position of a light beam is located near an information layer, the S-curve signal has a non-zero amplitude. An S-curve signal usually consists of two crest portions with two opposite polarities that appear on an FE signal, and there is a zero-cross point between those two crest portions. The zero-cross point of an S-curve signal indicates that the focus position is now located on the information layer (i.e., a focus is now set on that information layer). In a situation where the focus position is shifted with the level of the FE signal monitored, it can be seen that when the focus position comes rather close to an information layer, the level of the FE signal that has been zero changes to either a positive level or a negative level. The width of each of such crest portions of an S-curve signal is sometimes called a "detection range".

In this description, if the driving force is applied to bring the objective lens toward the optical disc, the polarities of the acceleration and deceleration pulses P1 and P2 are supposed to be "positive" and shown upwardly protruding on the drawings. On the other hand, if the driving force is applied to take the objective lens away from the optical disc, the polarities of the acceleration and deceleration pulses P1 and P2 are supposed to be "negative" and shown downwardly protruding on the drawings. That is to say, an upwardly protruding pulse will contribute to "acceleration" when applied in a situation where the objective lens is accessing the optical disc but will contribute to "deceleration" when applied in a situation where the objective lens is going away from the optical disc.

According to a conventional technique, no matter whether the given optical disc is a dual-layer disc or a four-layer disc, the output of either the upper or lower half of an S-curve, which appears when the focus position comes rather close to the target layer, is detected and the deceleration pulse P2 is output. According to another conventional technique, the deceleration pulse P2 is output by detecting either the negative portion of the S-curve signal representing the L2 layer (i.e., the amplitude of the right-hand side portion) as shown in portion (b) of FIG. 1 or the positive portion of the S-curve signal representing the L1 layer (i.e., the amplitude of the left-hand side portion) as shown in portion (c) of FIG. 1.

As for a dual-layer disc with a sufficiently broad layer pitch, if the deceleration pulse P2 is output on detecting the amplitude of either the upper or lower half of an S-curve signal (i.e., the positive or negative variation thereof) that appears when the focus position comes rather close to the target layer, the shift velocity of the focus position can be decreased (i.e., decelerated) well before the focus position reaches the target layer. On the other hand, as a multilayer optical disc, a four-layer disc has a much narrower layer pitch as shown in portion (a) of FIG. 2. That is why even if the deceleration pulse P2 is output on detecting the output of either the upper or lower half of an S-curve signal that appears when the focus position comes rather close to the target layer, the timing to start decreasing the shift velocity of the focus position may sometimes be too late to get a focus control done on the target layer just as intended.

FIGS. 3 and 4 illustrate a situation where the magnitude of spherical aberration correction to make is adjusted to an intermediate value between the target layer's and the current layer's. Specifically, portion (a) of FIG. 3 illustrates a cross section of a dual-layer BD. Portion (b) of FIG. 3 shows S-curves and acceleration and deceleration pulses P1 and P2 on a focus drive signal in a situation where the focus position is shifted from the L1 layer to the L2 layer. And portion (c) of FIG. 3 shows S-curves and acceleration and deceleration pulses P1 and P2 on a focus drive signal in a situation where the focus position is shifted from the L2 layer to the L1 layer. On the other hand, portion (a) of FIG. 4 illustrates a cross section of a four-layer BD. Portion (b) of FIG. 4 shows S-curves and acceleration and deceleration pulses P1 and P2 on a focus drive signal in a situation where the focus position is shifted from the L1 layer to the L4 layer. And portion (c) of FIG. 4 shows S-curves and acceleration and deceleration pulses P1 and P2 on a focus drive signal in a situation where the focus position is shifted from the L4 layer to the L1 layer.

As can be seen from FIGS. 3 and 4, even if the conventional technique disclosed in Patent Document No. 1 were adopted, the amplitudes of the S-curve signals would just be equalized with each other between the respective layers. What is worse, the closer to the target layer the focus position gets, the even smaller the amplitude of the S-curve signal compared to the situation where the spherical aberration correction has been made appropriately. Consequently, chances of failure of focus control would rather increase.

It is therefore an object of the present invention to provide an optical disc apparatus that can shift the focus position from one layer to another more quickly and with more stability even in a multilayer optical disc that has a greater number of information layers than a dual-layer disc. Another object of the present invention is to provide a method of getting a layer-to-layer jump done successfully in such a multilayer optical disc.

Solution to Problem

An optical disc apparatus according to the present invention includes: a layer-to-layer jump control section for controlling a layer-to-layer jump of a focus position from one of multiple information layers, which are stacked in a multilayer optical disc, to another; a spherical aberration correcting section having the ability to make a spherical aberration correction adaptively to each of the multiple information layers in the optical disc; and an S-curve signal detecting section for detecting an S-curve signal from any of the information layers after the layer-to-layer jump of the focus position has been started. Before or after the layer-to-layer jump of the focus position is started, the spherical aberration correcting section makes a spherical aberration correction adaptively to the information layer at which the shift velocity of the focus position starts to be decreased during the layer-to-layer jump. In response to the S-curve signal which is detected from the information layer that has been subjected to the spherical aberration correction, the layer-to-layer jump control section starts to decrease the shift velocity of the focus position during the layer-to-layer jump.

In one preferred embodiment, the information layer at which the shift velocity of the focus position starts to be decreased during the layer-to-layer jump is located between an information layer at which the focus position was located when the layer-to-layer jump was started and the target information layer of the layer-to-layer jump.

In this particular preferred embodiment, the information layer at which the shift velocity of the focus position starts to be decreased during the layer-to-layer jump is adjacent to the target information layer of the layer-to-layer jump.

In another preferred embodiment, before the layer-to-layer jump is started, the spherical aberration correcting section gets the spherical aberration correction done adaptively to an information layer that is located shallower than the target information layer of the layer-to-layer jump.

In still another preferred embodiment, after the layer-to-layer jump has been started, the spherical aberration correcting section changes the magnitudes of spherical aberration correction to be made depending on how much the focus position has shifted.

In yet another preferred embodiment, the spherical aberration correcting section minimizes the magnitude of spherical aberration correction to be made on one of the multiple information layers that is located closest to the focus position being shifted during the layer-to-layer jump.

In yet another preferred embodiment, after the layer-to-layer jump has been started, the layer-to-layer jump control section adaptively increases or decreases the shift velocity of the focus position according to the interval at which S-curve signals are detected when the focus position crosses the respective information layers.

A multilayer optical disc layer-to-layer jumping method according to the present invention is a method for controlling the layer-to-layer jump of a focus position from one of multiple information layers, which are stacked in a multilayer optical disc, to another. The method includes the steps of: before or after starting the layer-to-layer jump of the focus position, making a spherical aberration correction adaptively to the information layer at which the shift velocity of the focus position starts to be decreased during the layer-to-layer jump; detecting an S-curve signal from the information layer that has been subjected to the spherical aberration correction after having started the layer-to-layer jump; and on detecting the S-curve signal from the information layer that has been subjected to the spherical aberration correction, starting to decrease the shift velocity of the focus position during the layer-to-layer jump.

In one preferred embodiment, the information layer at which the shift velocity of the focus position starts to be decreased during the layer-to-layer jump is a particular layer to be selected from a group including an information layer that is adjacent to the target information layer of the layer-to-layer jump and an information layer that is located near the target information layer.

In this particular preferred embodiment, the information layer at which the shift velocity of the focus position starts to be decreased during the layer-to-layer jump is the information layer adjacent to the target information layer of the layer-to-layer jump.

In another preferred embodiment, the method includes the step of making an appropriate spherical aberration correction for the target information layer of the layer-to-layer jump after the shift velocity of the focus position has been decreased.

In still another preferred embodiment, the method includes the step of determining the pattern of the layer-to-layer jump by reference to information about the total number of layers included in the multilayer optical disc and layer-to-layer jump information including information about the starting point and the end point of the layer-to-layer jump.

In this particular preferred embodiment, the pattern of the layer-to-layer jump includes at least one of the layer on which a spherical aberration correction needs to be made before the layer-to-layer jump is started, the layer for which a deceleration signal needs to be generated, and the maximum number of layers to jump at a time.

In another preferred embodiment, the pattern of the layer-to-layer jump includes a pattern in which the focus position is shifted the starting point to the end point of the layer-to-layer jump in multiple steps.

In still another preferred embodiment, the S-curve signals detected from the respective information layers of the multilayer optical disc never overlap with each other.

In yet another preferred embodiment, the layer-to-layer jump is performed differently depending on whether the layer-to-layer jump needs to be performed in a direction in which an objective lens accesses the multilayer optical disc or in a direction in which the objective lens goes away from the multilayer optical disc.

In this particular preferred embodiment, when the layer-to-layer jump is performed in the direction in which the objective lens accesses the multilayer optical disc, the focus position being shifted crosses a smaller number of information layers than a situation where the layer-to-layer jump is performed in the direction in which the objective lens goes away from the multilayer optical disc.

Another optical disc apparatus according to the present invention includes a layer-to-layer jump control section for controlling a layer-to-layer jump of a focus position from one of multiple information layers, which are stacked in a multilayer optical disc, to another, and an S-curve signal detecting section for detecting an S-curve signal from the previous information layer that is located shallower than, and adjacent to, the target information layer of the layer-to-layer jump that has been started. The layer-to-layer jump control section starts to decrease the shift velocity of the focus position during the layer-to-layer jump in response to the S-curve signal which is detected and decreases the shift velocity most significantly at the previous information layer that is located shallower than, and adjacent to, the target information layer.

Another multilayer optical disc layer-to-layer jumping method according to the present invention is a method for controlling a layer-to-layer jump of a focus position from one of multiple information layers, which are stacked in a multilayer optical disc, to another. The method includes the steps of: detecting an S-curve signal from the previous information layer that is located shallower than, and adjacent to, the target information layer of the layer-to-layer jump that has been started; and starting to decrease the shift velocity of the focus position during the layer-to-layer jump in response to the S-curve signal which is detected and decreasing the shift velocity most significantly at the previous information layer that is located shallower than, and adjacent to, the target information layer.

ADVANTAGEOUS EFFECTS OF INVENTION

In an optical disc apparatus and layer-to-layer jumping method according to the present invention, after a layer-to-layer jump has been started in a multilayer optical disc, a slow down control is carried out on an information layer that has been subjected to a spherical aberration correction. That is why the shift velocity of the focus position can be decreased at the best timing irrespective of the layer pitch or the number of layers included in the given multilayer optical disc. Consequently, the layer-to-layer jump can be done with good stability even in a multilayer optical disc with a lot of information layers.

Also, in an optical disc apparatus and layer-to-layer jumping method according to the present invention, the focus position is shifted to the target information layer at a time. For that reason, compared to the conventional method in which it is not until a focus control gets established and stabilized on an adjacent layer that the focus position is shifted to the next layer and in which such an operation is performed a number of times, the focus position can get to the target layer in a much shorter time. As a result, not only long recording but also 3D recording and random accessibility are ensured as well, and therefore, the huge storage capacity of a given multilayer optical disc can be taken advantage of so effectively as to provide an application or an apparatus that uses such a disc as a replacement for a hard disk.

Also, in another preferred embodiment of the present invention, in response to an S-curve signal which is detected from the previous information layer that is located shallower than, and adjacent to, the target information layer of the layer-to-layer jump, the shift velocity is decreased most significantly. As a result, compared to a situation where a deceleration pulse should be applied responsive to the detection of an S-curve signal from the target information layer, the layer-to-layer jump can be stopped at the target information layer more safely. In such a preferred embodiment of the present invention, there is no need to minimize the spherical aberration at the previous information layer that is located shallower than, and adjacent to, the target information layer.

BRIEF DESCRIPTION OF DRAWINGS

Portion (a) of FIG. 1 illustrates a cross-sectional structure of a dual-layer BD, portion (b) of FIG. 1 shows the waveforms of focus error (FE) signals obtained from L1 and L2 layers, respectively, in a situation where a spherical aberration correction has been made so as to minimize the spherical aberration at the L2 layer (at a depth of 75 μm) in the dual-layer BD, and portion (c) of FIG. 1 shows the waveforms of FE signals obtained from the L1 and L2 layers, respectively, in a situation where a spherical aberration correction has been made so as to minimize the spherical aberration at the L1 layer (at a depth of 100 μm) in the dual-layer BD.

Portion (a) of FIG. 2 illustrates a cross-sectional structure of a four-layer BD, portion (b) of FIG. 2 shows the waveforms of FE signals obtained from L1 through L4 layers, respectively, in a situation where a spherical aberration correction has been made so as to minimize the spherical aberration at the L4 layer (at a depth of 75 μm) in the four-layer BD, and portion (c) of FIG. 2 shows the waveforms of FE signals obtained from the L1 through L4 layers, respectively, in a situation where a spherical aberration correction has been made so as to minimize the spherical aberration at the L1 layer (at a depth of 100 μm) in the four-layer BD.

Portion (a) of FIG. 3 illustrates a cross-sectional structure of a dual-layer BD, and portions (b) and (c) of FIG. 3 show the waveforms of S-curves and acceleration and deceleration pulses on a focus drive signal in a situation where the focus was shifted from the L1 layer to the L2 layer and in a situation where the focus was shifted from the L2 layer to the L1 layer, respectively.

Portion (a) of FIG. 4 illustrates a cross-sectional structure of a four-layer BD, and portions (b) and (c) of FIG. 4 show the waveforms of S-curves and acceleration and deceleration pulses on a focus drive signal in a situation where the focus was shifted from the L1 layer to the L4 layer and in a situation where the focus was shifted from the L4 layer to the L1 layer, respectively.

Portion (a) of FIG. 5 illustrates a cross-sectional structure of a dual-layer BD, and portion (b) of FIG. 5 shows the waveforms of FE signals respectively obtained from L1 and L2 layers of the dual-layer BD in a situation where the spherical aberration correction was made to minimize the spherical aberration at the L2 layer (at a depth of 75 μm) in the dual-layer BD.

Portion (a) of FIG. 6 illustrates a cross-sectional structure of a dual-layer BD, and portion (b) of FIG. 6 shows the waveforms of FE signals respectively obtained from L1 and L2 layers of the dual-layer BD in a situation where the spherical aberration correction was made to minimize the spherical aberration at the L1 layer (at a depth of 5100 μm) in the dual-layer BD.

Figure 7:
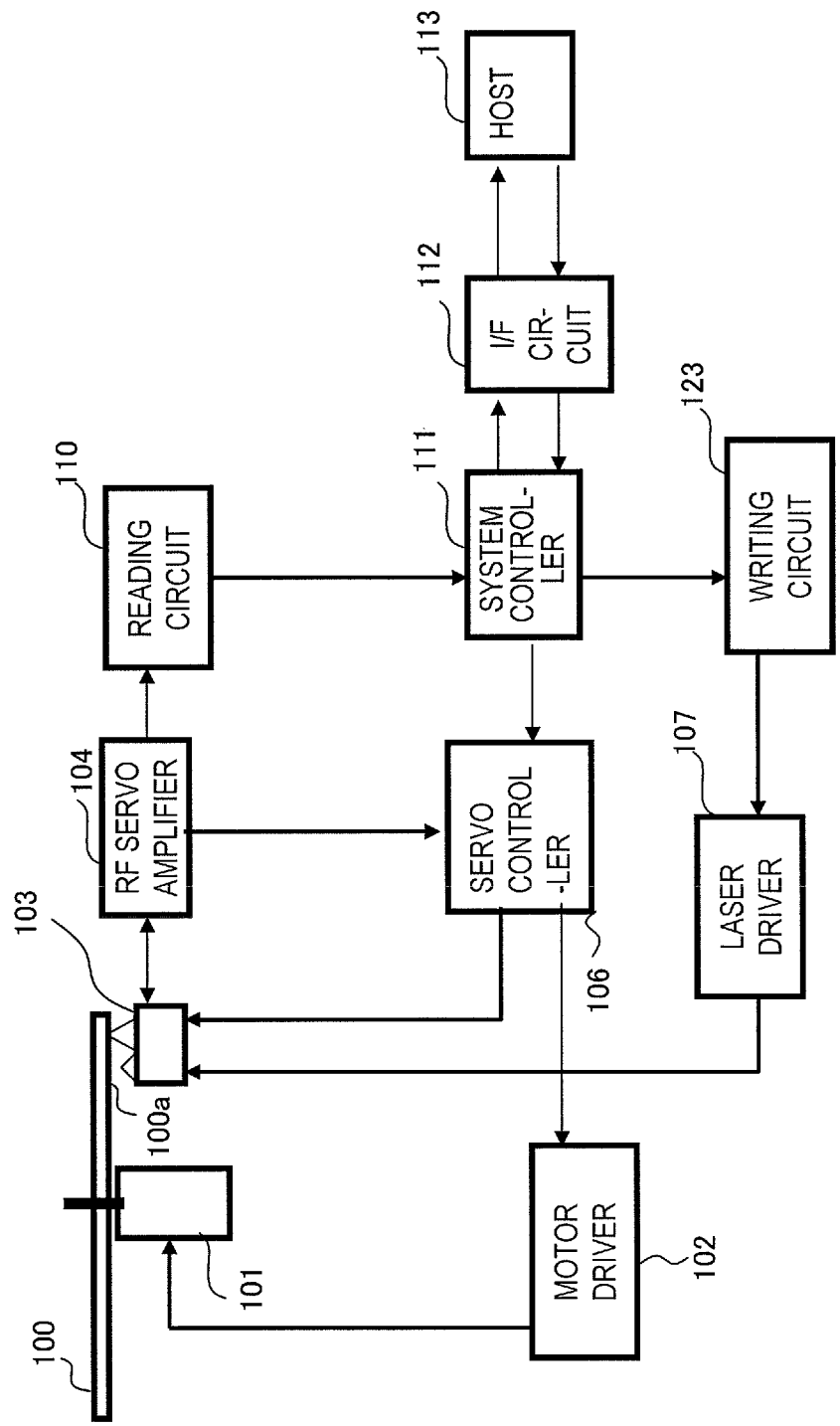

FIG. 7 is a block diagram illustrating an optical disc apparatus as a preferred embodiment of the present invention.

FIG. 8 is a table showing arrangement pattern #1 for a single-layer BD and multilayer BDs with two to sixteen layers, which form a set of four different groups of multilayer optical discs.

FIG. 9 is a table showing arrangement pattern #2 for a single-layer BD and multilayer BDs with two to sixteen layers, which also form another set of four different groups of multilayer optical discs.

FIG. 10 is a table showing arrangement pattern #3 for a single-layer BD and multilayer BDs with two to sixteen layers, which form still another set of four different groups of multilayer optical discs.

FIG. 11 is a table showing arrangement pattern #4 for a single-layer BD and multilayer BDs with two to sixteen layers, which form yet another set of four different groups of multilayer optical discs.

Figure 12:
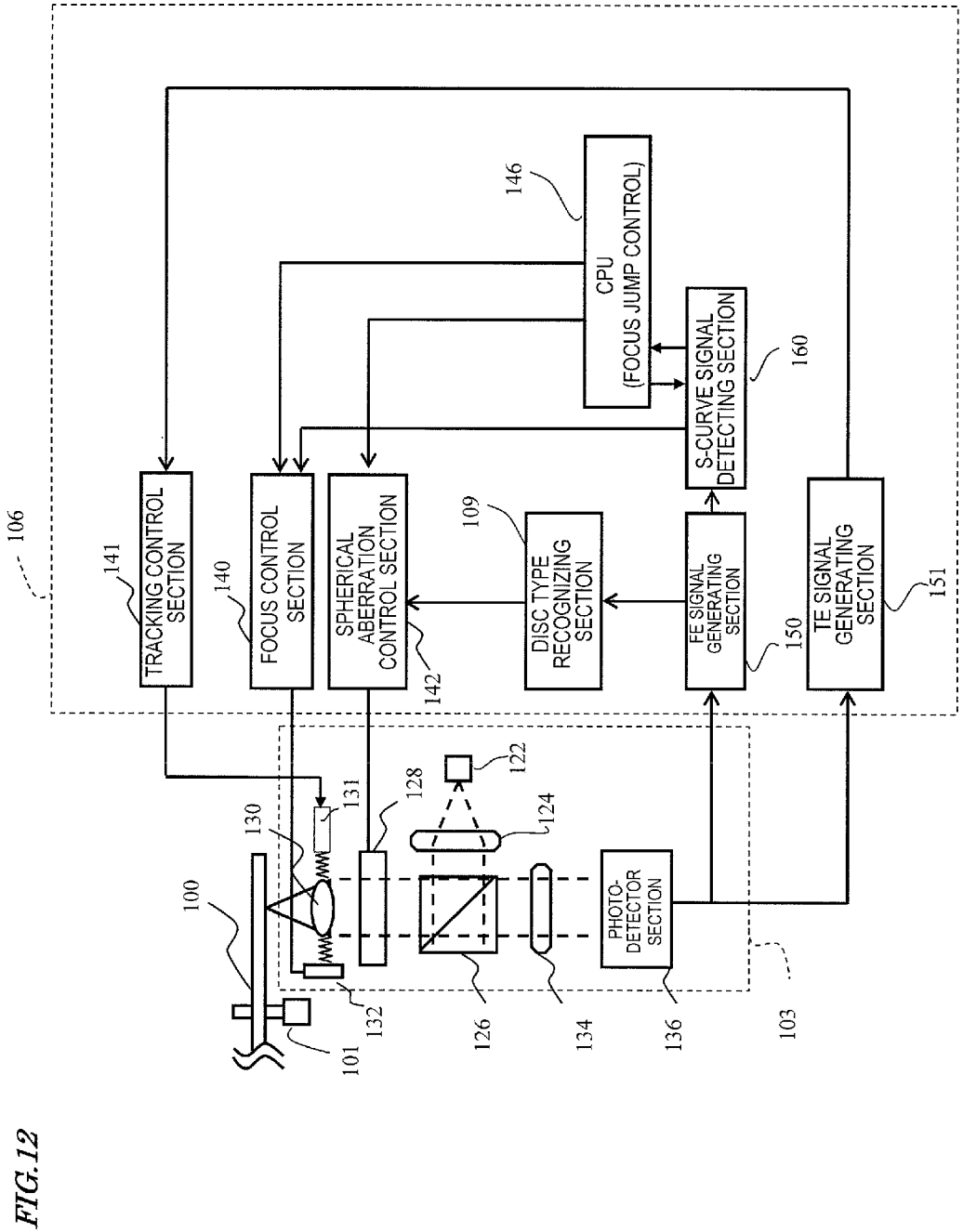

FIG. 12 is a block diagram illustrating a detailed configuration for the optical pickup, servo controller and their surrounding members shown in FIG. 7.

FIGS. 13(a) and 13(b) illustrate an exemplary internal arrangement for the spherical aberration correcting section 128 shown in FIG. 7.

Figure 14:
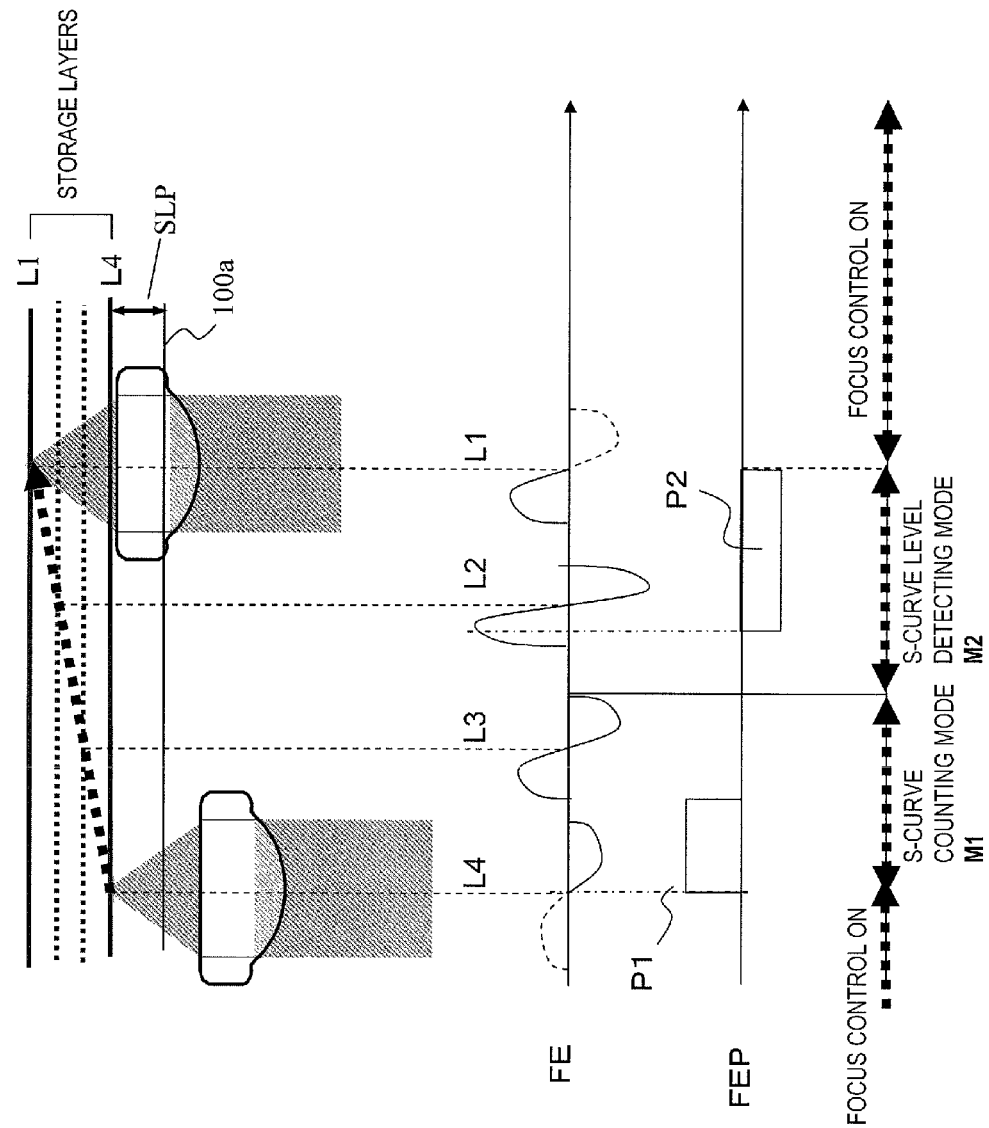

FIG. 14 is a schematic representation illustrating how the objective lens moves when a focus jump operation is performed to shift the focus position from the shallowest layer (i.e., L4 layer) to the deepest layer (i.e., L1 layer) and also showing how S-curve signals are generated when the focus position passes the respective layers of the multilayer BD.

Figure 15:
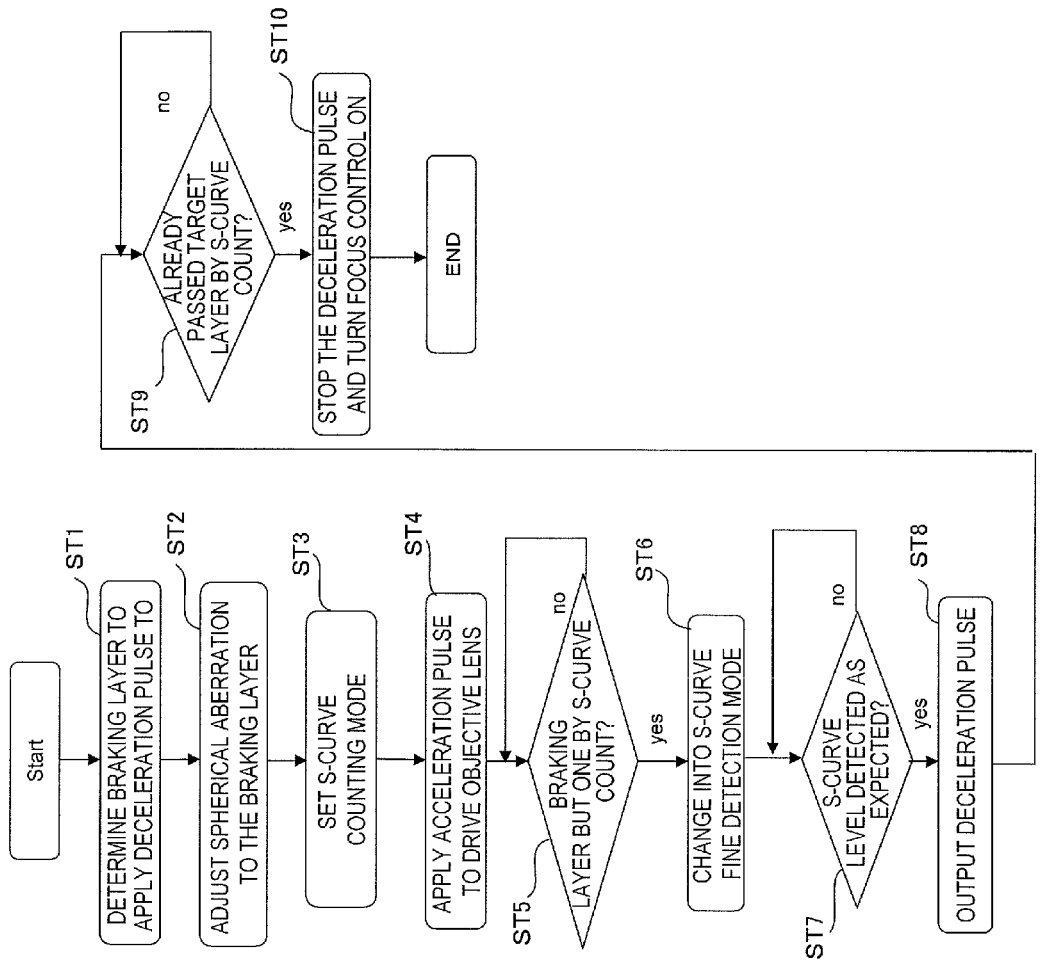

FIG. 15 is a flowchart showing the procedure of a focus jump operation.

Figure 16:
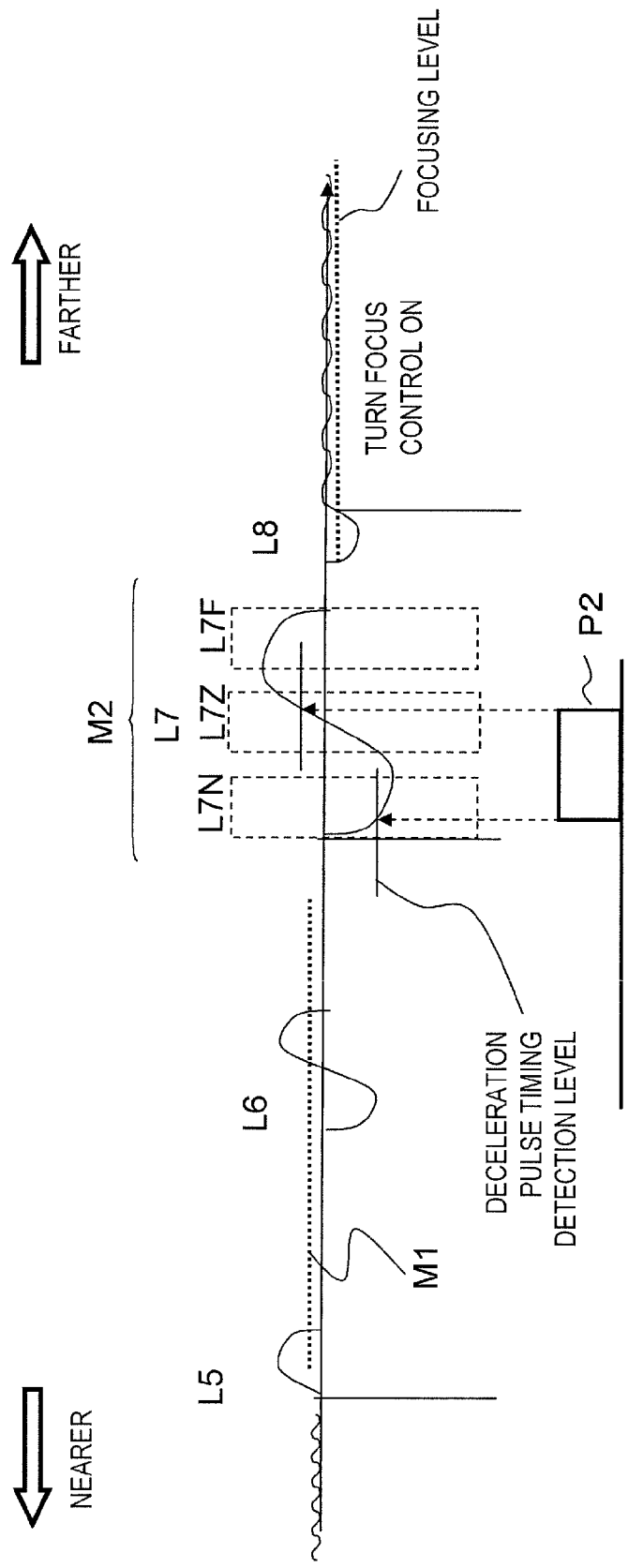

FIG. 16 shows the waveforms of an S-curve signal and a deceleration pulse P2, which are enlarged around the L7 layer that is a braking layer.

FIG. 17 is a table showing what information layer is used as the braking layer, how many layers can be jumped at a time at most, and how many jumps need to be made in respective shifting patterns for dual-layer, four-layer and eight-layer BDs.

FIG. 18 is a table showing what information layer is used as the braking layer, how many layers can be jumped at a time at most, and how many jumps need to be made in various shifting patterns for a sixteen-layer BD.

Figure 19:
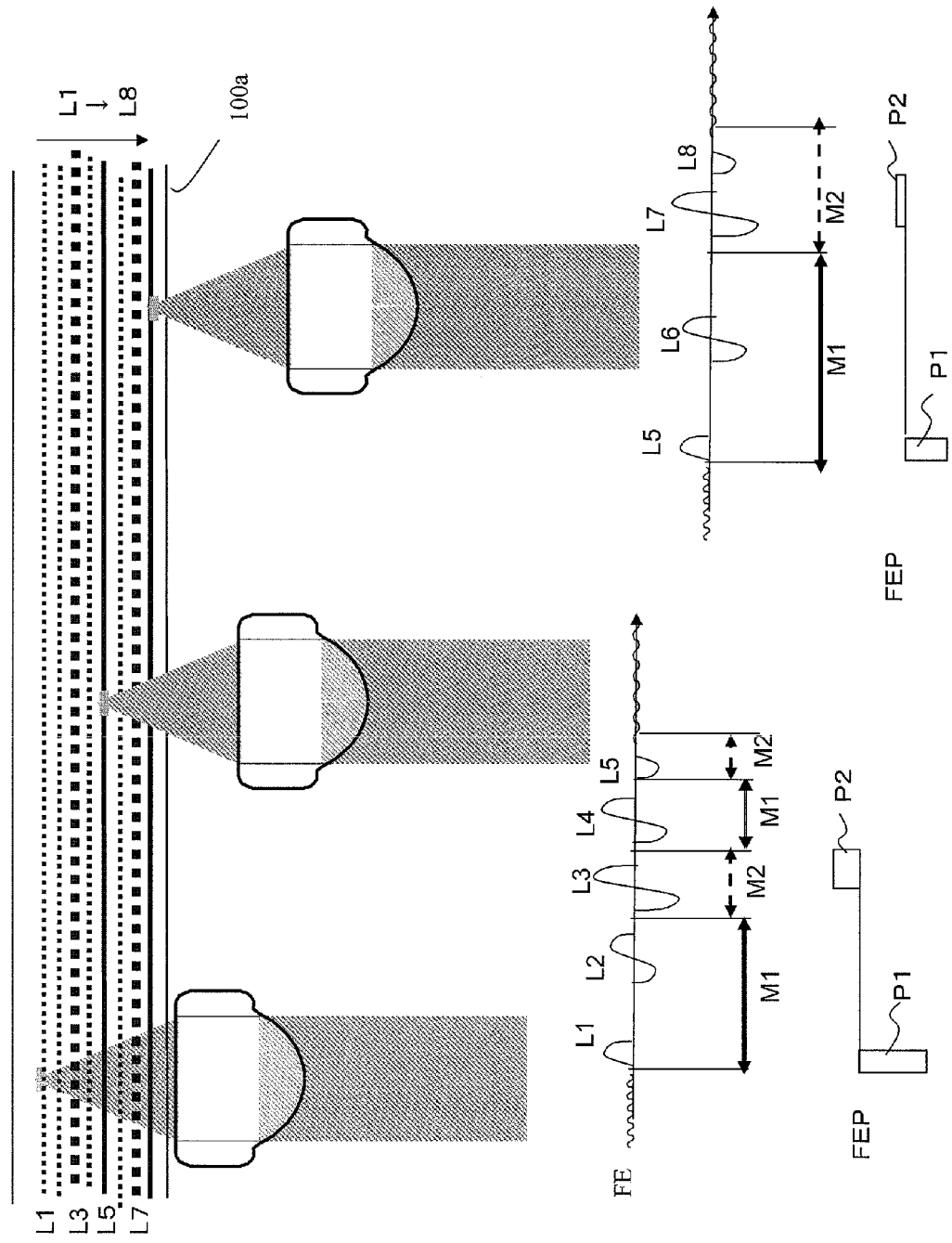

FIG. 19 shows the waveforms of S-curve signals to appear on an FE signal and the timings to apply an acceleration pulse P1 and a deceleration pulse P2 when a jump is made for the first time from L1 layer to L5 layer and when a jump is made for the second time from the L5 layer to L8 layer.

FIGS. 20(a) and 20(b) illustrate another exemplary internal configuration for the spherical aberration correcting section 128 shown in FIG. 7.

Figure 21:
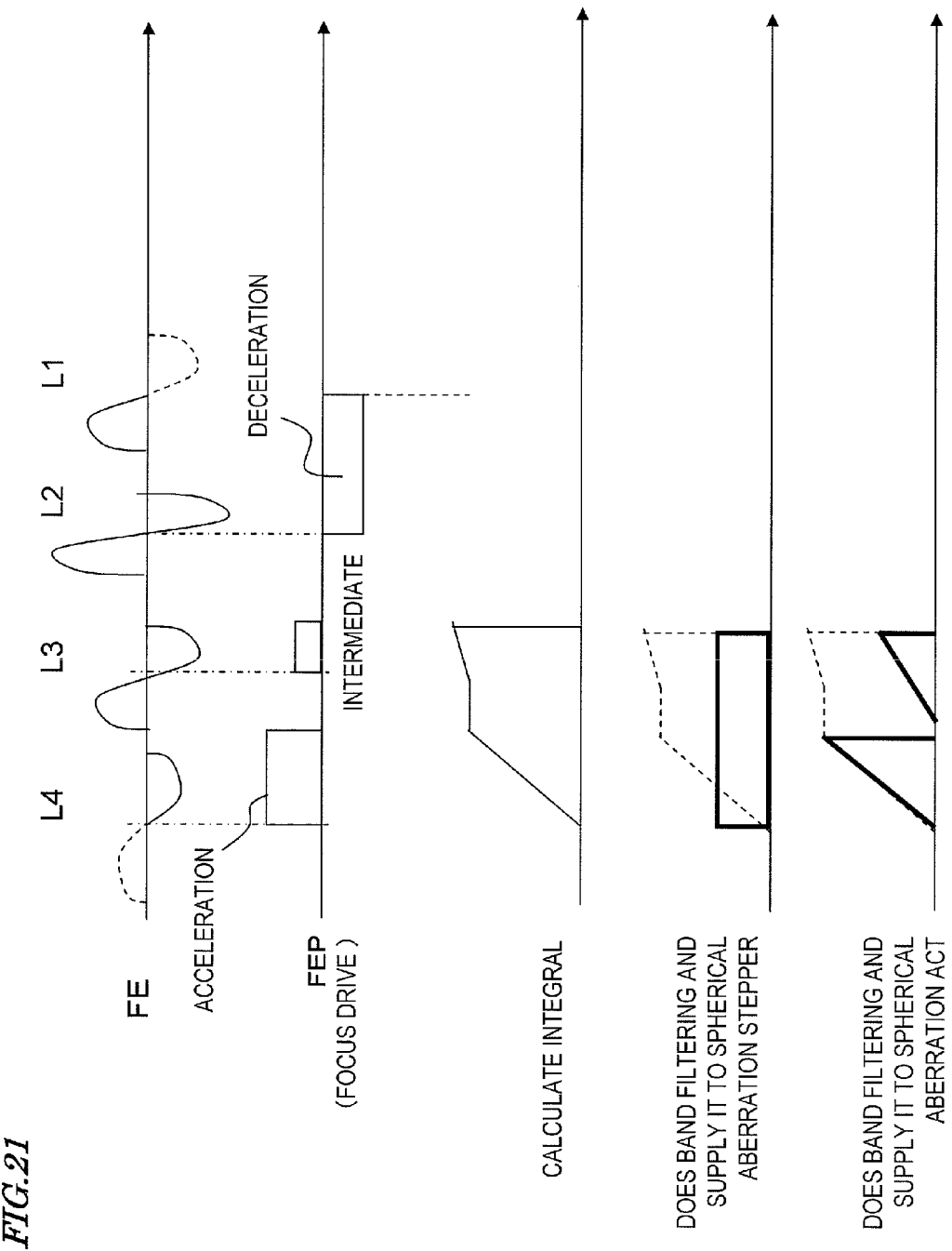

FIG. 21 shows S-curve signals and drive signals (including acceleration, intermediate and deceleration pulses) to be generated or applied when the focus position passes through the respective layers of a multilayer BD to get a focus jump done from the shallowest layer (L4 layer) to the deepest layer (L1 layer) thereof.

Figure 22:
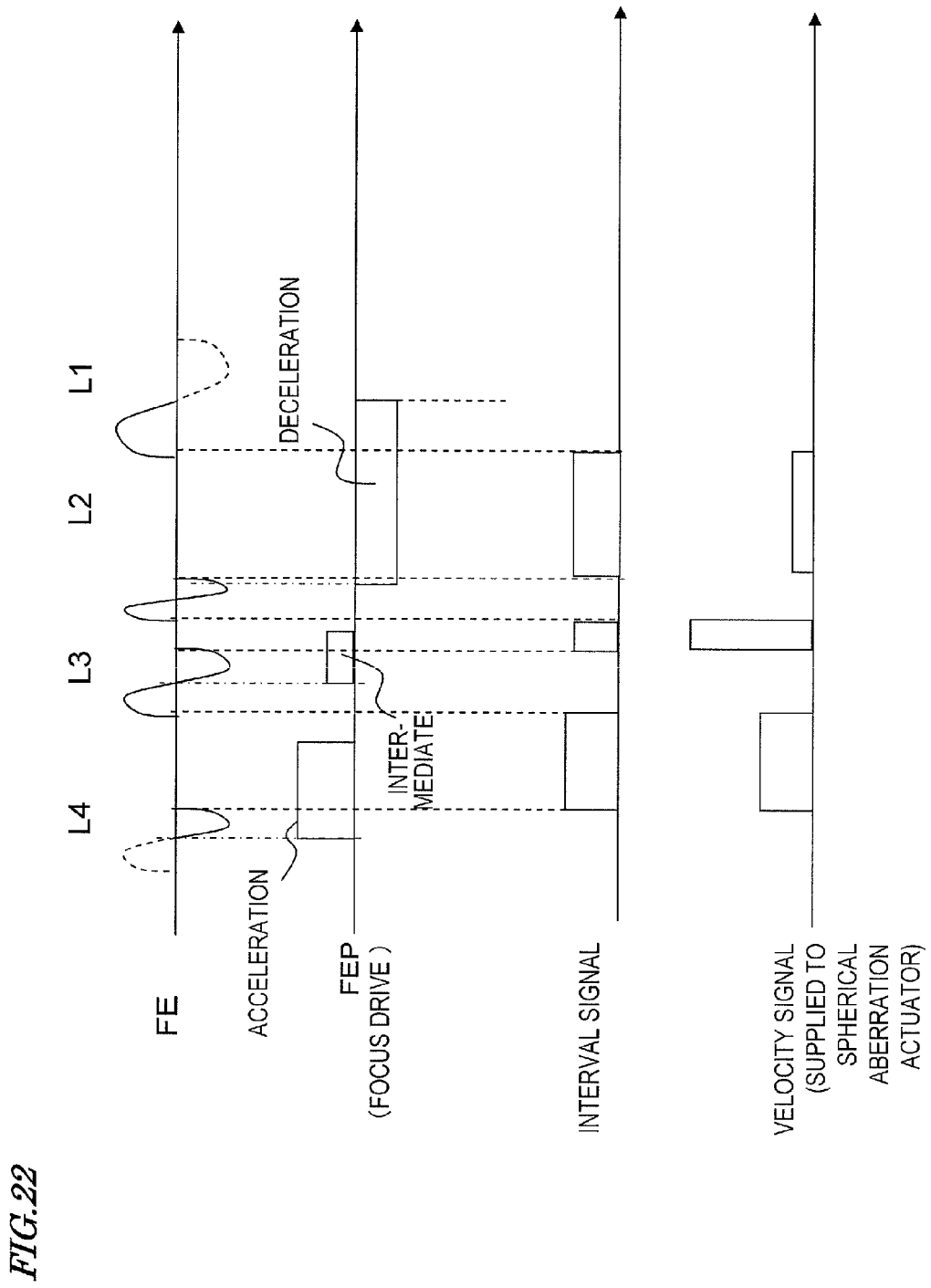

FIG. 22 is a timing diagram showing how to measure the time interval between the S-curve signals while a focus jump operation is being carried out, calculate the shift velocity based on that interval, and then feed back a signal representing that velocity to an actuator.

DESCRIPTION OF EMBODIMENTS

In the prior art, the S-curve signal, which appears on a focus error (FE) signal, just needs to be detected from a dual-layer DVD with a layer pitch of 40 µm or from a dual-layer BD with a layer pitch of 25 µm, for example. That is why as far as a dual-layer disc is concerned, even if each half of the S-curve signal (i.e., its detection range) has a width of 10 µm as shown in FIG. 1, the S-curve signal is still regarded as contributing to getting a focus jump done.

As for a multilayer BD with three or more information layers, however, its information layers should be stacked one upon the other with the layer pitch narrowed compared to the dual-layer BD. And therefore, to detect S-curve signals from the respective layers independently of each other and to reduce the crosstalk between the respective layers as much as possible, the S-curve signal detection range should be narrowed. Otherwise, the S-curve signals representing adjacent information layers would overlap with each other, crosstalk should be produced between them, and it could be rather difficult to tell the respective information layers from each other by the S-curve signals. In a four-layer BD with a layer pitch reduced all the way down to 5 µm, for example, each half of the S-curve signal (i.e., its detection range) should have its width reduced to as small as 2 µm as shown in FIG. 2 to detect the S-curve signals from the respective layers. That is why as shown in FIG. 2, even when a layer-to-layer jump is being made, it is not until the focus position comes very close to the target layer that the S-curve signal representing that layer is generated.

Hereinafter, it will be described with reference to FIGS. 5 and 6 how to make a focus jump from one of two information layer to the other using a pickup that is also compatible with a multilayer optical disc. In this example, the layer-to-layer jump is supposed to be made from L1 layer to L2 layer.

Each portion (a) of FIGS. 5 and 6 illustrates schematically a cross section of a dual-layer BD, a situation where the focus is set on the L1 layer, and a situation where the focus is set on the L2 layer.

Portion (b) of FIG. 5 shows the waveforms of FE signals detected from the L1 and L2 layers in a situation where a spherical aberration correction has been made to minimize the spherical aberration at the L2 layer of a dual-layer BD (which is located at a depth of 75 µm). On the other hand, portion (b) of FIG. 6 shows the waveforms of FE signals detected from the L1 and L2 layers in a situation where a spherical aberration correction has been made to minimize the spherical aberration at the L1 layer of the dual-layer BD (which is located at a depth of 100 µm).

If the S-curve signals detected from a conventional dual-layer disc by such an optical disc apparatus compatible with a multilayer optical disc are monitored, the dead zone will be so broad that the S-curve signal is generated only in the vicinity of either the current layer or the target layer while a focus jump operation is being performed as shown in FIGS. 5 and 6.

That is why if an extreme value or its vicinity of the S-curve signal representing the target layer (i.e., L2 layer), where the signal has the maximum amplitude, is detected and a deceleration pulse P2 is output as shown in portion (b) of FIG. 5, the timing of braking will be too late to decrease the shift velocity of the focus position sufficiently and to avoid a failure of focus control. However, if an extreme value or its vicinity of the S-curve signal representing the current layer (i.e., L1 layer), where the signal has the maximum amplitude, is detected and a deceleration pulse P2 is output as shown in portion (b) of FIG. 6, the timing of braking will be too early this time. In that case, the focus position will return to where it was due to the influence of out-of-plane vibrations of the disc, for example.

In such a situation, if a timing signal should be generated in response to the S-curve signal representing the target layer (L2 layer) which is detected, the output level of the S-curve signal could be stabilized with the magnitude of spherical aberration correction to make adjusted to the target layer (L2 layer) to secure an earlier timing of detection. And by outputting the deceleration pulse P2 as soon as the dead zone with zero level is passed and the S-curve signal is detected, the shift of the focus position should start to be slowed down.

On the other hand, if a timing signal should be generated in response to the S-curve signal representing the current layer (L1 layer) which is detected, the magnitude of spherical aberration correction to make could be kept adjusted to the current layer to delay the timing of braking accurately, and the gradient of the S-curve signal waveform may be monitored continuously. And by outputting the deceleration pulse in a predetermined time since its gradient value went zero, the shift velocity of the focus position could be decreased.

If the number of information layers in a disc were three or more, however, it should be difficult to get the layer-to-layer jump done accurately by such a method.

According to the present invention, the spherical aberration correction is made adaptively to the information layer for which a signal representing the timing of braking needs to be generated (which will be referred to herein as a "braking layer") and the spherical aberration correction on that information layer is minimized, thereby generating a bigger and more stabilized S-curve signal from that information layer. And a deceleration pulse is output based on the S-curve signal generated from that information layer.

In another preferred embodiment of the present invention, when an S-curve signal is detected from the previous information layer that is located shallower than, and adjacent to, the target information layer of the layer-to-layer jump, the shift velocity is decreased most significantly. As a result, compared to a situation where the focus shift should start to be slowed down responsive to the detection of an S-curve signal from the target information layer, the layer-to-layer jump can be stopped at the target information layer more safely.

(Embodiment 1)

Hereinafter, preferred embodiments of an optical disc apparatus and method of making a layer-to-layer jump according to the present invention will be described.

FIG. 7 is a block diagram illustrating an optical disc apparatus as a first specific preferred embodiment of the present invention. FIGS. 8 through 11 are tables showing exemplary arrangements of a single-layer BD and multilayer (from dual-layer through sixteen-layer) BDs that the first preferred embodiment of the present invention is compatible with.

First of all, exemplary arrangements of a multilayer optical disc, with which the optical disc apparatus of this preferred embodiment can be loaded, will be described.

A multilayer optical disc may have any of various combinations of layers. However, considering compatibility with single- and dual-layer BDs that have already been put on the market, it is preferred that the reference layer (i.e., L1 layer) that is located most distant from the disc surface 100a always have a constant depth of 100 μm.

If the interval between the information layers were too narrow, then crosstalk would be produced between the information layers. For that reason, the interval between the information layers (which will be referred to herein as "layer pitch (LP)") is preferably equal to or greater than 3 μm.

Also, considering the influence of scratches and dust that could be present on the surface of the optical disc, the light-transmissive layer cannot be too thin (i.e., the distance from the disc surface 100a to the shallowest layer under the disc surface 100a cannot be too short). An optical system for use to read from or write to a BD has as high an NA as 0.85. And generally speaking, the higher the NA of an objective lens, the shorter its focal length should be. In view of these considerations, the light-transmissive layer preferably has a thickness of at least 25 μm.

In view of these considerations, dual-layer, four-layer, six-layer, eight-layer, ten-layer, twelve-layer, fourteen-layer, and sixteen-layer optical discs could have an arrangement in any of the four patterns shown in FIG. 8, 9, 10 or 11.

According to Patterns #1 and #2 shown in FIGS. 8 and 9, the interval between each pair of adjacent information layers is as broad as it can be. Specifically, in the example of Pattern #1, a regular interval is left between each pair of adjacent information layers. More specifically, in a sixteen-layer optical disc, the layer-to-layer interval becomes 5 μm and the light-transmissive layer has a thickness of 25 μm. On the other hand, in the example of Pattern #2, the layer-to-layer interval is changed alternately between two values to cancel the crosstalk phenomenon. In the sixteen-layer optical disc, the interval between an odd-numbered layer and an even-numbered layer becomes 5 μm, the interval between an even-numbered layer and an odd-numbered layer becomes 4 μm, and the light-transmissive layer has a thickness of 32 μm.

On the other hand, according to Patterns #3 and #4 shown in FIGS. 10 and 11, the distance from the surface to the layer that is closest to that surface (i.e., the thickness of the light-transmissive layer) is given a top priority. In the example of Pattern #3, a regular interval is left between each pair of adjacent information layers. For instance, a sixteen-layer optical disc has a layer-to-layer interval of 3.125 μm and its light-transmissive layer has a thickness of 53.125 μm. On the other hand, in the example of Pattern #4, the layer-to-layer interval is changed alternately between two values to cancel the crosstalk phenomenon. In the sixteen-layer optical disc, the interval between an odd-numbered layer and an even-numbered layer becomes 3.125 μm, the interval between an even-numbered layer and an odd-numbered layer becomes 3 μm, and the light-transmissive layer has a thickness of 54 μm.

Generally speaking, in a multilayer optical disc, the layer-to-layer interval and the thickness of the light-transmissive layer are actually somewhat greater or smaller than those exemplary values due to some variation that inevitably occurs during a manufacturing process. Nevertheless, typical arrangements of multilayer optical discs can be roughly classified into those four patterns described above. The focus jump of this preferred embodiment is commonly applicable to all of those four patterns. For that reason, only Pattern #1 will be described in detail and the other patterns #2, #3 and #4 will be described just complementarily as needed.

Hereinafter, it will be described with reference to FIG. 7 what configuration the multilayer optical disc apparatus of this preferred embodiment may have and how the apparatus may operate.

This optical disc apparatus includes an optical pickup 103, a servo controller 106 for controlling the operation of the optical pickup 103, a reading circuit 110 for reading an information signal that has been detected by the optical pickup 103 on the optical disc 100, and a writing circuit 123 for writing information to be stored on the optical disc 100. The optical pickup 103 includes an optical system for converging the light beam onto the optical disc 100, a photodetector section for detecting the light reflected from the optical disc 100 and a laser diode as a light source. The writing circuit 123 makes the laser driver 107 drive the laser diode and make the laser diode generate pulses of laser beams by a predetermined modulation method according to the information to be stored, thereby writing the information on the optical disc 100.

The optical pickup 103 irradiates the optical disc 100, which has been mounted on an optical disc motor 101, with a converged laser beam. An RF servo amplifier 104 generates an electrical signal based on the light that has been reflected from the optical disc 100. The servo controller 106 performs a focus control and a tracking control on the optical disc 100 that has been mounted on the optical disc motor 101 by controlling a motor driver 102 and the optical pickup 103. The servo controller 106 includes a disc type recognizing section 109 for determining, by irradiating the optical disc 100 with a light beam using the light source and lenses, whether the given optical disc 100 is a BD or not, and whether the disc 100 has only one layer, two layers, or more than two layers.

The reading circuit 110 gets the electrical signal, which has been supplied from the RF servo amplifier 104, equalized by a waveform equalizer, for example, thereby generating an analog read signal, which is converted into a digital signal and then synchronized with a read clock signal (i.e., a reference clock signal) by a PLL. In this manner, the data can be extracted. Thereafter, the data is subjected to predetermined demodulation and error correction and then supplied to a system controller 111, which transfers the data to a host 113 by way of an I/F circuit 112.

Then, the writing circuit 123 adds a header and redundant bits for error correction to the data, modulates it into a predetermined modulation pattern (by predetermined modulation technique), and then gets pulsed laser beams emitted from the laser diode in the optical pickup 103 by the laser driver 107 in order to write the information that has been supplied from the host 140 by way of the I/F circuit 131 on the optical disc 100. By varying the reflectance of the recording material (such as an organic material or a phase change material) of the optical disc 100 according to the degree of intensity modulation of the laser beam that has been incident on the optical disc 100, information is written as ones or zeros.

FIG. 12 is a block diagram illustrating, in further detail, the optical pickup, the servo controller and their surrounding sections that have something to do with the focus jump operation to be done on the multilayer optical disc of this preferred embodiment. Hereinafter, the present invention will be further described with reference to FIG. 12.

First of all, the configuration of the optical pickup will be described. The optical pickup 103 shown in FIG. 12 includes a light source 122, a coupling lens 124, a polarization beam splitter 126, a spherical aberration correcting section 128, an objective lens 130, actuators 131, 132, a condenser lens 134 and a photodetector section 136.

The light source 122 may be a semiconductor laser diode that emits a light beam. In FIG. 12, only one light source 122 is illustrated for the sake of simplicity. However, the light source may actually be made up of three semiconductor laser diodes, which emit light beams with mutually different wavelengths. Specifically, the single optical pickup includes multiple semiconductor laser diodes for emitting light beams with mutually different wavelengths for CDs, DVDs and BDs, respectively. In FIG. 12, those light sources are combined into the single light source 122 for convenience sake.

The coupling lens 124 transforms the light beam that has been emitted from the light source 122 into a parallel light beam. The polarization beam splitter 126 reflects the parallel light beam that has come from the coupling lens 124. The position of the semiconductor laser diode to use in the light source 122 and the wavelength of the light beam emitted will change according to the type of the given optical disc. That is why the configuration of the best optical system also changes according to the type of the given optical disc 100. For that reason, the configuration of the actual optical pickup 103 is more complicated than the illustrated one.

The objective lens 130 converges the light beam that has been reflected from the polarization beam splitter 126. The actuator 132 controls the position of the objective lens 130 in response to the FE and TE signals so that the objective lens 130 is always located at its predetermined position. In reading or writing data from/on a target one of the information layers of the optical disc 100, the focal point of the light beam that has been converged by the objective lens 130 is located on the target information layer, thereby forming a light beam spot on that information layer. In FIG. 12, only one objective lens 130 is illustrated. Actually, however, there are multiple objective lenses 130, one of which is selectively used according to the type of the given optical disc 100. When data is being read or written, focus servo and tracking servo controls are activated so that the focal point of the light beam follows the target tracks on the target information layer and the position of the objective lens 130 is controlled highly accurately.

In this preferred embodiment, the optical disc 100 is what a read/write operation needs to be performed on using the blue-violet laser diode 122 and the objective lens 130 with a high NA in combination. Although the optical pickup 103 is supposed to have such a simplified configuration as what is shown in FIG. 12 for the sake of simplicity, the optical pickup 103 may actually have additional light sources and objective lenses for CDs and/or DVDs.

After the optical disc 100 has been loaded, a focus jump operation is performed in order to read or write data from/on an arbitrary one of the information layers that the optical disc 100 has. Specifically, the actuator 132 is activated so as to move the objective lens 130 along the optical axis and shift the focus position from one of those information layers after another.

The spherical aberration correcting section 128 includes an aberration correction lens 228 (see FIG. 13), which can change its position in the optical axis direction, for example. And by adjusting the position of the aberration correction lens 228, the degree of spherical aberration (i.e., the magnitude of correction) can be changed, which is a so-called "beam expander arrangement". However, the spherical aberration correcting section 128 does not always have to have such a beam expander arrangement but may also have an arrangement for reducing the aberration by using a liquid crystal cell or a hinge.

The light beam that has been reflected from the target information storage layer of the optical disc 100 passes through the objective lens 130, the spherical aberration correcting section 128 and the polarization beam splitter 126 and then enters the condenser lens 134, which converges the light that has been reflected from the optical disc 100 and then passed through the objective lens 130 and the polarization beam splitter 126 on the photodetector section 136. In response, the photodetector section 136 receives the light that has been transmitted through the condenser lens 134 and converts the optical signal into various kinds of electrical signals (i.e., current signals). The photodetector section 136 may be a quadruple photodetector section with four photosensitive areas, for example.

The servo controller 106 shown in FIG. 12 includes a focus control section 140, a tracking control section 141 and a spherical aberration control section 142. Using these circuit sections, the CPU 146 controls various kinds of operations to be performed by the optical pickup 130. The servo controller 106 further includes an FE signal generating section 150, a TE signal generating section 151, an S-curve signal detecting section 160, and a disc type recognizing section 109.

The focus control section 140 drives the focusing actuator 132 in accordance with the instruction given by the CPU 146, thereby moving the objective lens 130 to any arbitrary position along the optical axis.

On the other hand, the tracking control section 141 drives the tracking actuator 131, thereby moving the objective lens 130 to any radial location on the optical disc 100, and also performs a tracking control so that the light beam spot on the optical disc 100 follows the tracks in response to a TE signal supplied from the TE signal generating section 151.

Figure 13:
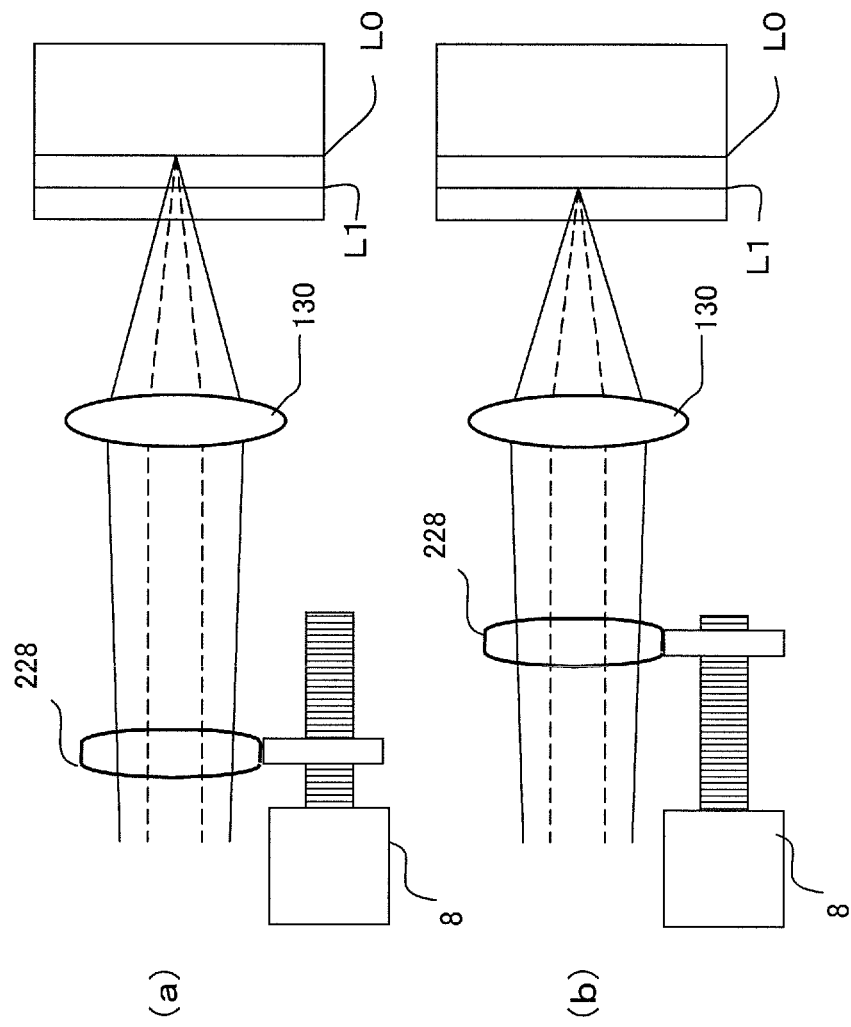

In accordance with the instruction given by the CPU 146, the spherical aberration control section 142 controls the spherical aberration correcting section 128 into a predetermined setting. FIG. 13 illustrates an internal arrangement for the spherical aberration correcting section 128. Specifically, in response to the control signal supplied from the spherical aberration control section 142, the stepping motor 8 shown in FIG. 13 operates so as to displace the aberration correction lens 228 to a predetermined position, which is defined by the cover layer thickness of the first or second layer. By changing the position (i.e., the position in the optical axis direction) of the aberration correction lens 228, the spherical aberration state of the light beam can be regulated. The same operation or function can be done in a similar manner in any of the four- to sixteen-layer optical disc or even in a twenty-layer optical disc.

The FE signal generating section 150 generates an FE signal based on the electrical signals that have been supplied from multiple photosensitive areas of the photodetector section 136. The method of generating the FE signal is not particularly limited. Thus, the FE signal may be generated by an astigmatism method, a knife edge method or even a spot sized detection (SSD) method. The output FE signal of the FE signal generating section 150 is supplied to the S-curve signal detecting section 160, which sets a predetermined detection threshold value in accordance with the instruction given by the CPU 146.

The TE signal generating section 151 generates a TE signal based on the electrical signals that have been supplied from multiple photosensitive areas in the photodetector section 136. As for a recordable medium with land and groove tracks such as a BD-R or a BD-RE, the TE signal is usually generated by push-pull detection method. On the other hand, as for a read-only medium with embossed information pre-pits such as a BD-ROM, the TE signal is usually generated by a phase difference detection method. However, the method of generating a TE signal is not particularly limited by any tracking method.

The S-curve signal detecting section 160 determines whether or not the level of the FE signal exceeds a predetermined threshold value while the objective lens 130 is moving along the optical axis to make a focus search, thereby detecting an S-curve signal. According to this preferred embodiment, the spherical aberration value is set according to the depth of the layer to which a deceleration pulse P2 should be applied in a compatible multilayer optical disc, i.e., the braking layer that is located between the information layer as the target of the layer-to-layer jump and the information layer at which the layer-to-layer jump is started. In this preferred embodiment, the previous information layer that is located shallower than, and adjacent to, the target information layer is chosen as the braking layer.

In the rest of this description, the information layer that is located between the information layer at which the layer-to-layer jump is started (which will be referred to herein as a "jump start layer") and the target information layer and that is adjacent to the target information layer will be referred to herein as "the previous information layer" that is located shallower than, and adjacent to, the target information layer. The braking layer is certainly typically the previous information layer that is located shallower than, and adjacent to, the target information layer. However, the present invention is in no way limited to that specific preferred embodiment. Alternatively, with the shift velocity of the focus position during the layer-to-layer jump and the weight of the objective lens taken into consideration, an information layer that is located deeper than the target information layer by more than one layer could be chosen as the braking layer as well.

After the spherical aberration correction has been made adaptively to the braking layer, the tracking control and the focus control are turned OFF and an acceleration pulse P1 is applied to the actuator 132. In this manner, when the braking layer is detected after the objective lens has been driven toward the target layer, the deceleration pulse P2 is output. Since the deceleration pulse P2 is applied to the actuator 132 when the focus position reaches the previous layer that is located shallower than, and adjacent to, the target layer (i.e., the braking layer), the shift velocity of the focus position can be decreased. Furthermore, according to this preferred embodiment, the number of S-curve signals to be detected during the focus jump operation is counted, and the focus control is turned ON when the target layer is reached. Consequently, the focus position can be shifted to the target layer just as intended.

FIG. 14 is a schematic representation illustrating how the objective lens moves with respect to a four-layer disc when a focus jump operation is performed to shift the focus position from its shallowest layer (i.e., L4 layer) to its deepest layer (i.e., L1 layer) and also showing how S-curve signals are generated when the focus position passes the respective layers of the multilayer BD. On the other hand, FIG. 15 is a flowchart showing the procedure of a focus jump operation to be performed in such a situation.

In this description, the focus position to be shifted as the objective lens is moved in the thickness direction of the optical disc will sometimes be referred to herein as a "light beam spot position". This is because the cross section of a light beam to be converged by the objective lens forms the smallest light beam spot at the focus position. Also, when a light beam is in focus with a certain information layer, the focus position is located on that information layer and a light beam spot is formed on that information layer. As used herein, the "focus jump" or "layer-to-layer jump" means shifting the focus position from one information layer to another and can be done by moving the objective lens in the thickness direction of the optical disc.

Hereinafter, it will be described with reference to FIGS. 14 and 15 how to perform the focus jump operation of this preferred embodiment.

First, in Step ST1 shown in FIG. 15, if the focus position is now set on the shallowest layer (i.e., the L4 layer) and if it is currently in a standby state, a seek command is received from the host 113. And if the target address is a track address on the deepest layer (i.e., the L1 layer), then the focus position should be shifted from the L4 layer to the L1 layer, and the layer at which the shift velocity of the focus position should start to be slowed down (i.e., the braking layer) is set to be the L2 layer, which is located shallower than, and adjacent to, the L1 layer that is the end point of the layer-to-layer jump. That is to say, the timing to apply the deceleration pulse P2 is defined to be when an S-curve signal is detected before the focus position reaches the L2 layer. Next, in Step ST2, the spherical aberration control section 142 is instructed to drive the spherical aberration correction lens 228 shown in FIG. 13 so that the correction value agrees with the cover layer thickness (or the depth) of the L2 layer.

In this example, the spherical aberration correction is made so as to minimize the spherical aberration at the L2 layer to be the braking layer. That is why when the focus position is located right on, or in the vicinity of, the L2 layer, various signals (including RF, FE and TE signals) generated from the L2 layer have their amplitude maximized. As a result, the S-curve signal also has its amplitude maximized and is sharpened, too.

In FIG. 14, FE signals (i.e., S-curve signals) obtained from the L1 through L4 layers are also shown schematically. In this example, the focus position is shifted after the spherical aberration correction has been made so that the L2 layer has a minimum spherical aberration (and ideally has zero spherical aberration), and therefore, the S-curve signal obtained from the L2 layer has the greatest amplitude. Meanwhile, the rest of the information layers other than the L2 layer (i.e., the L1, L3 and L4 layers) have not had their spherical aberration minimized, and therefore, the S-curve signals obtained from those layers have relatively small amplitudes. Furthermore, the waveforms of those S-curve signals have been laterally broadened (i.e., blunted) due to their spherical aberration and have come to have a greater detection width. With such a blunted S-curve that has been obtained from a layer for which the spherical aberration has not been corrected, it is difficult to locate the information layer accurately.

After the spherical aberration correction lens has been driven, first of all, the S-curve detection level is lowered (i.e., brought closer to zero) in Step ST3. In this manner, the modes of operation are changed into an S-curve counting mode M1 (which will also be referred to herein as "S-curve signal coarse detection mode M1" and) in which S-curve signals can also be detected safely even from information layers that have not been subjected to the spherical aberration correction and in which the number of information layers can be counted. Thereafter, the tracking control is turned OFF and an acceleration pulse P1 is applied to the focus actuator 132 in Step ST4. In response to the acceleration pulse P1 applied, the focus actuator 132 drives the objective lens 130 with acceleration in the optical axis direction. In this manner, the focus position shifts across the information layers and toward the end point of the layer-to-layer jump.

In Step ST5, every time the focus position passes an information layer (i.e., the L3 layer and then the L2 layer in this example), the S-curve signal is output. That is why by counting the number of the S-curve signals output, it can be seen exactly where the focus position being shifted is currently located. Next, in Step ST6, when it is known, by the count of the S-curve signals, that the L3 layer, which precedes the L2 layer that is the braking layer, is passed, the deceleration pulse P2 is output. That is why the S-curve signal will be detected from the L2 layer in an S-curve signal fine detection mode M2.

Next, in Step ST7, the level of the S-curve signal is determined. When the shallowest portion of the L2 layer is detected by a half of the S-curve signal, it means that this is the right time to output the deceleration pulse. Thus, in Step S8, the crest value of the deceleration pulse P2 is determined by the amount of time it has taken to get there and then that value is output. And the deceleration pulse needs to stop being applied when it is known, by the count of the S-curve signals, that the layer beyond the end point of the layer-to-layer jump is reached. If it has been decided, in Step ST9, that the layer beyond the end point of the layer-to-layer jump has been reached, the deceleration pulse stops being output in Step S10 (more specifically, when a half of the S-curve signal representing the shallowest portion of the L1 layer is detected). Then, the focus control is turned ON immediately. Since the shift velocity of the focus position has already been reduced sufficiently by then, the focus can be set on the target layer with very good stability.

It is also shown in FIG. 14 how the S-curve signals are output as the focus position is shifted from one layer to another and how the modes of operation are changed in response to the output of those S-curve signals.

According to this preferred embodiment, before the focus jump operation is started, the spherical aberration correction is made in advance so that the braking layer has a spherical aberration of zero. As a result, the S-curve signal representing the braking layer has the maximum amplitude and also has an increased SNR. Consequently, an S-curve signal with a high resolution can be obtained, and therefore, the amplitude level of the S-curve signal can be detected more precisely and the timing to start applying the deceleration pulse can be set more finely. That is why the velocity of jump between multiple layers can be controlled with good stability.

FIG. 16 illustrates how the S-curve signal counting mode (i.e., the S-curve signal coarse detection mode) M1 and the S-curve signal fine detection mode M2 shown in FIG. 15 work. In the example illustrated in FIG. 16, the S-curve signal counting mode M1 is set for the L5 and L6 layers, and the S-curve signal fine detection mode M2 is set for the L7 and L8 layers. As indicated by the S-curve signal representing the L7 layer in FIG. 16 and its surrounding ranges, the timing can be defined arbitrarily in the S-curve signal fine detection mode M2 in all of the "nearer portion" L7N (to be passed when the objective is getting closer to the disc surface 100a), the "middle and surrounding portions" L7Z and the "farther portion" L7F (to be passed when the objective lens is going away from the disc surface 100a) of the L7 layer, and the variation in the S-curve signal can be detected precisely.

First of all, if the mode of operation is set to be the S-curve signal counting mode M1, the detection level of the S-curve will be M1, which is close to the zero level. Since the spherical aberration correction has not been made on the L5 or L6 layer yet (i.e., as there is a significant spherical aberration on the L5 and L6 layers), it is difficult to obtain a sufficiently great S-curve amplitude. Nevertheless, as the S-curve signals are still output even though their amplitude levels are low, the S-curve signals can be counted safely with the detection level lowered.

In that S-curve signal counting mode M1, when the focus position reaches a range that is rather close to the L7 layer after the S-curve signals representing the L5 and L6 layers have been counted, the modes of detecting the S-curve signal are changed into the fine detection mode M2. In that S-curve signal fine detection mode M2, the magnitude of spherical aberration correction to make is adjusted to the L7 layer represented by the S-curve signal, and therefore, the spherical aberration is minimized at the L7 layer. As a result, an S-curve signal with great amplitude can be obtained easily. On top of that, the S-curve signal can be detected at more precisely defined levels. Consequently, the starting point and end point of the deceleration pulse P2, of which the timing of application is particularly important, can be adjusted more finely.

For example, as shown in FIG. 16, one S-curve signal output range is divided into three sub-ranges L7N, L7Z and L7N, the S-curve signal detection levels are set to be appropriate ones so that a timing signal can be generated in each of those divided sub-ranges, and then the timing signal is generated. And both the acceleration and deceleration may be started at that timing. As a result, even if there are some out-plane vibrations or if there is a variation in layer pitch, the deceleration pulse P2 can still be applied to the focus actuator at the best timing.

Next, it will be described how to determine the braking layer.

It is preferred that the deceleration pulse P2 actually have its application timing and output value (i.e., the crest value) appropriately adjusted according to the weight of the lens, the thrust of the actuator, the velocity of the lens, and other factors. However, in a conventional pickup for use with BDs or DVDs, the timing to start applying the deceleration pulse is preferably around the middle of the distance to go if the distance is as short as 100 μm or less. On the other hand, if the pickup should go as long a distance as more than 100 μm, it is preferred that the focus shift be started to be slowed down approximately 50 μm before the target layer. For example, in a situation where the focus jump operation needs to be performed on any of the group of multilayer optical discs shown in FIG. 8, once the type of the given disc is known, the layer pitch (LP) of each of Groups #0 through #3 can be known automatically. That is why information about the distance to go and information about the number of layers to jump can also be obtained by finding the seek pattern. For that reason, with such a combination, it can be determined, either by reference to a table or by making calculations in accordance with a program, exactly where the braking layer is and how many information layers the focus position can jump at a time at most.

Tables of braking layers for use to make such a decision on the maximum number of layers to jump and the number of layers to jump at a time for dual-layer, four-layer, eight-layer, and sixteen-layer BDs are shown in FIGS. 17 and 18.

In FIGS. 17 and 18, the braking layers are identified by L2N, L2Z, L2F and so on. Following is the meaning of these reference signs. Specifically, the braking layer L2N refers to the nearer portion of the L2 layer (to be passed when the objective is getting closer to the disc surface 100a). The braking layer L2Z refers to the "middle and surrounding portions" of the L2 layer. And the braking layer L2F refers to the farther portion of the L2 layer (to be passed when the objective lens is going away from the disc surface 100a).

As shown in FIG. 17, if a jump needs to be done from the L1 layer to the L2 layer of a dual-layer BD in Group #0, the braking layer is identified by L2N (middle). In that case, either the fall to the zero level of the S-curve signal representing the L1 layer or the rise from the zero level (identified by L2N) of the S-curve signal representing the L2 layer is detected, and the deceleration pulse P2 is output.

The same braking layer as in the dual-layer BD is used when a jump needs to be done from the L1 layer to the L2 layer of a four-layer BD in Group #1. On the other hand, if a jump needs to be done from the L1 layer to the L3 layer, the braking layer is identified by L2Z. In that case, the L2 layer is set to be the braking layer and the fall to approximately the zero level (identified by L2Z) of the former or latter portion of the S-curve signal representing the shallower or deeper portion of the L2 layer is detected and the deceleration pulse P2 is output. Furthermore, if a jump needs to be done from the L1 layer to the L4 layer, the braking layer is identified by L3N. In that case, the L3 layer is set to be the braking layer and the rise from the zero level (identified by L3Z) to a neighboring predetermined level of the former portion of the S-curve signal representing the shallower portion of the L3 layer is detected and the deceleration pulse P2 is output.

In an eight-layer BD of Group #2, the same braking layer is used as in the four-layer BD in making a jump from the L1 layer to the L2 layer, from the L1 layer to the L3 layer, or from the L1 layer to the L4 layer. On the other hand, if a jump needs to be done from the L1 layer to the L5 layer, the braking layer is identified by L3Z. In that case, the L3 layer is set to be the braking layer and the fall to approximately the zero level (identified by L3Z) of the former or latter portion of the S-curve signal representing the shallower or deeper portion of the L3 layer is detected and the deceleration pulse P2 is output.

Furthermore, if a jump needs to be done from the L1 layer to the L8 layer, the pattern of jumping is indicated by L1→L5→L8. In that case, the first jump should be done from the L1 layer to the L5 layer and the second jump should be done from the L5 layer to the L8 layer to begin with. In making the first jump from the L1 layer to the L5 layer, the first braking layer is identified by L3Z. In that case, the L3 layer is set to be the braking layer and the fall to approximately the zero level (identified by L3Z) of the former or latter portion of the S-curve signal representing the shallower or deeper portion of the L3 layer is detected and the deceleration pulse P2 is output. When the L5 layer is reached, the focus is once set there. Next, in making the second jump from the L5 layer to the L8 layer, the second braking layer is identified by L7Z. In that case, the L7 layer is set to be the braking layer and the fall to approximately the zero level (identified by L7Z) of the former or latter portion of the S-curve signal representing the shallower or deeper portion of the L7 layer is detected and the deceleration pulse P2 is output. And when the L8 layer is reached, the focus is set there definitively to end the focus jump operation.

Hereinafter, it will be described in further detail with reference to FIGS. 16 and 19 exactly how to make a jump from the L1 layer to the L8 layer.

FIG. 19 illustrates a cross section of respective storage layers of the disc when the first jump (from the L1 layer to the L5 layer) and the second jump (from the L5 layer to the L8 layer) are made and also shows the waveforms of S-curve signals to appear on the FE signal and the timing to apply an acceleration pulse P1 and a deceleration pulse P2 to be output when the S-curve signal representing the braking layer is detected. If the first jump is determined to be made from the L1 layer to the L5 layer as described above, the magnitude of spherical aberration correction to make is adjusted to the L3 layer to be the braking layer. That is to say, the spherical aberration correction is made so that the L3 layer has the smallest spherical aberration.

After that, by applying the acceleration pulse P1, the objective lens starts to be moved so that the focus position shifts toward the L5 layer. In this case, since the magnitude of spherical aberration correction to make is adjusted to the L3 layer, the S-curve signal has the greatest amplitude at the L3 layer. And the more distant from the L3 layer, the smaller the amplitude of the S-curve signal gets. However, in the S-curve counting mode (i.e., S-curve signal coarse detection mode) M1, the amplitude of the S-curve signal does not become equal to zero at any information layer other than the L3 layer, either, and S-curve signals representing the L1 and L2 layers can be detected. That is why it is possible to sense that the focus position has passed through the L1 layer and reached the L2 layer. Furthermore, the passage of the focus position through the L2 layer can also be sensed even by providing an S-curve signal coarse detection level M1 in the vicinity of the zero level. When the focus position passes through the L2 layer, the modes of operation are changed from the S-curve signal coarse detection mode M1 into the S-curve signal fine detection mode M2, which is a mode in which the amplitude levels of the S-curve signal are defined finely. As will be described later, the S-curve signal fine detection mode M2 will also be performed when the focus position passes through the L6 layer.

FIG. 16 shows an operation in the S-curve signal fine detection mode M2. As can be seen from the S-curve signal representing the L7 layer and its surrounding ranges shown in FIG. 16, in the S-curve signal fine detection mode M2, the variation in the S-curve signal can be detected precisely in all of the nearer portion L7N (to be passed when the objective is getting closer to the disc surface 100a), the middle and surrounding portions L7Z and the farther portion L7F (to be passed when the objective lens is going away from the disc surface 100a) of the L7 layer, and the point of application of the deceleration pulse P2 can also be finely adjusted. As a result, even if these are some out-of-plane vibrations or a variation from one layer to another, the deceleration pulse P2 can still be applied to the focus actuator at the best timing.

Now, take a look at FIG. 19 again.

Once the deceleration pulse P2 has been applied, the modes of operation are changed into the S-curve signal coarse detection mode M1 again to find that the focus position has passed through the L4 layer. Thereafter, the modes of operation are once again changed into the S-curve signal fine detection mode M2 to set the focusing level on the L5 layer. And when that focusing level is reached, the focus control is turned ON.

The second jump (from the L5 layer to the L8 layer) is also done in the same way. That is to say, after the magnitude of spherical aberration correction to make has been adjusted to the braking layer (i.e., the L7 layer), it is sensed in the S-curve signal coarse detection mode M1 that the L5 and L6 layers have been passed. And then in the S-curve signal fine detection mode M2, when an S-curve signal representing the nearer portion of the L7 layer that is located closer to the disc is detected, the deceleration pulse P2 is generated. After that, the focus position is further shifted toward the L8 layer by inertial force. And when the S-curve signal reaches the focusing level on the L8 layer, the focus control is turned ON. As for this second jump, the braking layer and the target layer are adjacent to each other, their magnitudes of spherical aberration are close to each other, and therefore, the amplitudes of their S-curve signals are approximately equal to each other. That is why the S-curve signal fine detection mode M2 is continued from the braking layer through the target layer. Optionally, to get focusing done accurately by increasing the amplitudes of the FE signal representing the target layers L5 and L8 of the first and second jumps as much as possible, the drive operation could be started so that the magnitude of spherical aberration correction to make is adjusted to the target layer L5 or L8 after the deceleration pulse P2 has been applied for the L3 or L7 layer.

Also, if eight, sixteen or even twenty layers are going to be jumped at a time in an eight-layer, sixteen-layer or twenty-layer BD, the distance to go after the application of a deceleration pulse would be so long in some cases that the shift velocity of the focus position sometimes could be decreased excessively. In that case, the maximum number of layers that could be jumped at a time may be determined in advance. For example, if the max is defined to be five layers, then the sequences could be changed into the one that requires three jumps to get to the target layer as for a sixteen-layer BD or the one that requires four jumps to get to the target layer as for a twenty-layer BD.

FIG. 18 shows exemplary jumps that could be made in a sixteen-layer BD. As can be seen, even if the number of layers to jump is sixteen or even twenty, the settings could change according to their layer pitch or the number of layers to jump but the braking layer to which the deceleration pulse P2 needs to be applied, the maximum number of layers to jump at a time, and the number of times of jumps to be made can also be determined in the same way.

As described above, the multilayer optical discs are classified into a number of groups (i.e., Groups #0 through #3) as shown in FIGS. 17 and 18, and the shifting pattern of the layer-to-layer jump is determined by reference to the information about the total number of layers included in a given multilayer optical disc and the layer-to-layer jump information including information about the starting point and the end point of the layer-to-layer jump. Also, in the example described above, the shifting pattern is supposed to include information about the layer to be subjected to a spherical aberration correction before the layer-to-layer jump is made, information about the braking layer at which a deceleration signal should be generated, and the maximum number of layers to jump at a time. However, the shifting pattern may include at least one of three different kinds of information. Furthermore, in the example described above, the shifting pattern is supposed to include a pattern in which the layer-to-layer jump is made from the current layer to the target layer in multiple steps. In this case, it is preferred that the S-curve signals obtained from respective layers of a multilayer optical disc do not overlap with each other.

In this preferred embodiment, the S-curve signal is supposed to be detected within a range of 2 µm. However, the greater the number of information layers included in a multilayer optical disc, the shorter the layer pitch will get. That is why to detect the respective layers just as intended and to eliminate the crosstalk between them, the S-curve signal should be detected within an even narrower range. For that reason, the width of the S-curve signal (i.e., the interval between its local maximum and local minimum values) to be detected while the focus position is shifting during a focus jump operation would be very narrow. As a layer pitch of approximately 5 µm to 15 µm will also be maintained in multilayer optical discs to be produced from now on, a narrower S-curve signal detection range will make the interval between the S-curve signals more easily sensible. As a result, the information layers will be more easily recognizable by the S-curve signals.

As described above, in a multilayer optical disc, it can be sensed highly accurately by an S-curve signal exactly when the focus position passes through an information layer during a focus jump operation. And by counting the number of S-curve signals to be detected during the focus jump operation and by measuring their interval of detection, the shift velocity of the focus position (i.e., the velocity of its shift in the thickness direction of the disc) can be obtained.

For example, in the focus jump operation shown in portion (a) of FIG. 19, the time interval T12 between respective local maximums T1 and T2 of the S-curve signals representing the L1 and L2 layers and the time interval T23 between respective local minimums B1 and B2 of the S-curve signals representing the L2 and L3 layers can be measured. If the time interval T12 or T23 is longer than a predetermined value (which is a standard value calculated based on the designed shift velocity), then the shift velocity of focus position can be determined to be low, and therefore, the rate of deceleration is preferably decreased. In that case, either the crest value Vbr or the width Tbr of the deceleration pulse P2 may be reduced.

On the other hand, if the time interval T12 or T23 is shorter than the predetermined value, then the shift velocity of the focus position can be determined to be high, and therefore, the rate of deceleration is preferably increased. In that case, either the crest value Vbr or the width Tbr of the deceleration pulse P2 may be increased. In this manner, the shift velocity of the focus position can be obtained by measuring the interval at which the S-curve signals are detected, and the rate of acceleration or deceleration can be adjusted according to the shift velocity during the focus finding operation.

In the example described above, the time interval between the S-curve signals representing the first two layers is supposed to be measured. However, the present invention is in no way limited to that specific preferred embodiment. For example, in a multilayer optical disc with as many as ten or even sixteen layers, sometimes ten layers should be jumped at a time without stopping halfway. In that case, the interval between the S-curve signals may be measured either every other layer or every two layers, and the deceleration or acceleration pulse may be applied with the crest value adjusted with respect to every measured value. Then, even when a focus jump operation needs to be done over a long distance by passing through as many as ten or sixteen layers, the shift velocity can still be adjusted within a predetermined range. As a result, the focus position can be shifted from one layer to another with good stability and the focus can be set right on the target layer finally reached.

In the example illustrated in FIG. 19, every time a focus jump operation is performed, the focus position starts being shifted responsive to a single acceleration pulse P1 applied and stops being shifted responsive to a single deceleration pulse. However, the present invention is in no way limited to that specific preferred embodiment. Rather, in order to adjust the shift velocity of the focus position while detecting that velocity during a focus jump operation as described above, either an acceleration pulse or a deceleration pulse may be applied at least once between the acceleration and deceleration pulses P1 and P2.

Hereinafter, it will be described how to change settings for a multilayer focus jump so as to increase the reliability by avoiding collision between the lens and the disc.

An optical disc apparatus such as a PC drive or a recorder/player is often installed horizontally. That is why depending on whether the focus jump should be made from a deeper layer of a multilayer optical disc to a shallower layer thereof or in the opposite direction, the gravitational force applied to the objective lens in its moving direction will be different by 2G, where G represents the gravitational acceleration. For that reason, the objective lens is often accelerated excessively when moving downward (i.e., when the focus position is shifted from a deeper layer toward a shallower layer), and is often overly decelerated when moving upward (i.e., when the focus position is shifted from a shallower layer toward a deeper layer). This works fine as far as potential collision between the objective lens and the optical disc is concerned. However, to further reduce the chances of collision and to deal with vertically installed BD players and PC drives, this should not be called absolutely safe.

That is why to further reduce the chances of collision, when a focus jump operation needs to be performed upward (i.e., when the focus position should be shifted from a shallower layer of a multilayer optical disc to a deeper layer thereof), the focus position may be shifted at a time to the previous layer before the target layer and then only one layer may be jumped to get to the target layer. On the other hand, as there is little risk of collision when the focus jump operation is performed downward (when the focus position is shifted from a deeper layer toward a shallower layer), the focus position could be shifted directly to the target layer at a time.

In that case, even if the same number of layers need to be jumped, the braking layers are preferably changed depending on whether the focus jump operation is going to be performed upward (i.e., from a shallower layer toward a deeper layer) or downward (i.e., from a deeper layer toward a shallower layer) in order to get the focus jump done with good stability.

For these reasons, depending on whether the objective lens is moving toward, or going away from, the given multilayer optical disc, the layer-to-layer jump may be carried out differently. Optionally, if the objective lens is moving toward the multilayer optical disc to make a layer-to-layer jump, the focus position may cross a smaller number of information layers before reaching the target layer of the layer-to-layer jump compared to a situation where the objective lens is going away from the multilayer optical disc.

In the preferred embodiments of the present invention described above, before the focus jump operation is started, the spherical aberration correction is done so that the spherical aberration becomes equal to zero at the braking layer. As a result, the S-curve signal detected from the braking layer comes to have maximum amplitude and an increased SNR. Consequently, a high-resolution S-curve signal can be obtained. That is why the S-curve signal can be detected at finer amplitude levels, and therefore, the timing to apply the deceleration pulse P2 can be determined properly. If the spherical aberration correction is made so as to optimize the spherical aberration at the braking layer, however, there is no need to postpone shifting the focus position until the spherical aberration correction is done. That is to say, in that case, the spherical aberration correction may be made with the focus position shifted.

If the optical disc apparatus is designed to perform a focus jump operation while correcting the spherical aberration adaptively to each of the multiple information layers, then an S-curve signal in good shape can be obtained from each information layer. As a result, every time the focus position passes through an information layer, the velocity can be controlled smoothly. Specifically, the drive signals (including acceleration, intermediate and deceleration pulses) as shown in FIG. 21, which the focus actuator driver of the focus control section 140 shown in FIG. 12 outputs to the actuator 132 when a focus jump is going to be made, are subjected to computations and then the signals obtained by making those computations are supplied to the spherical aberration correcting section 128 (see FIG. 12). In FIG. 13, the spherical aberration correcting section 128 gets the spherical aberration correction lens 228 driven by the stepping motor 8. Actually, however, an actuator is preferably arranged between the spherical aberration correction lens 228 and the stepping motor 8 in order to correct the spherical aberration.

Figure 20:
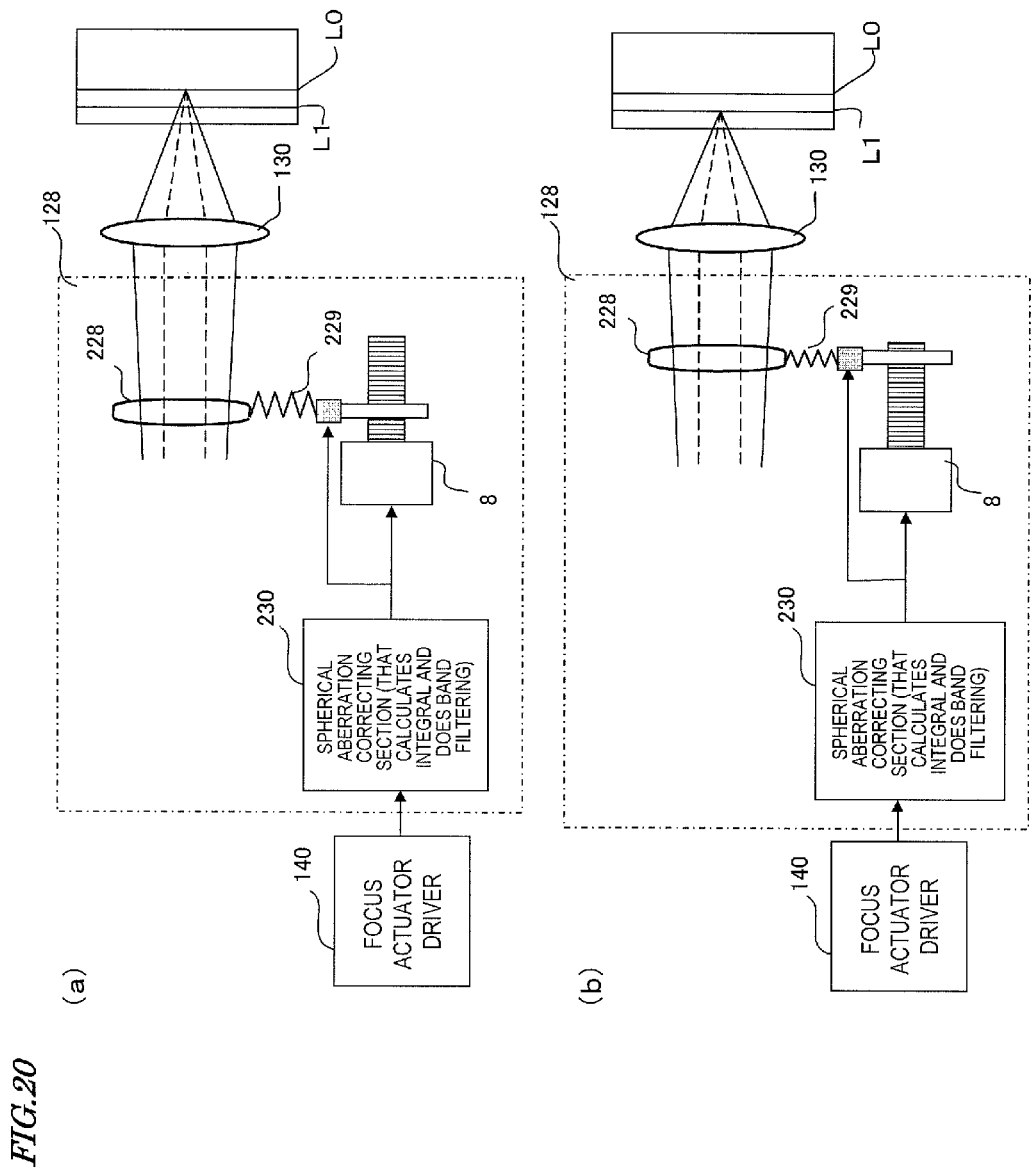

FIG. 20 illustrates an alternative configuration for the spherical aberration correcting section 128 with such an actuator 229. In FIG. 20, the focus actuator driver of the focus control section 140 outputs a drive signal to a spherical aberration correcting section 230, which carries out computations on the drive signal thus supplied and then outputs the signals obtained by making the computations to the stepping motor 8 and an actuator 229, respectively. The actuator 229 has a narrower operating range but a higher degree of responsivity than the stepping motor 8. That is why to change the modes of spherical aberration correction as soon as the focus position passes through one of multiple information layers after another, the position of the spherical aberration correction lens 228 is preferably finely adjusted quickly by the actuator 229 with a high degree of responsivity.

As shown in FIG. 21, if a jump needs to be made from the L4 layer of a four-layer disc to the L1 layer thereof, an acceleration pulse, an intermediate pulse and a deceleration pulse are applied responsive to the first, second and third S-curve signals, respectively. In that case, by extracting respective positive portions of the pulses to be applied while the focus position is shifting toward the target layer and calculating their integral, a value (or a signal) representing the magnitude of shift in the focusing direction can be obtained. Then, the signal thus obtained is subjected to band filtering, and then the resultant signals are supplied to the stepping motor 8 and the actuator 29, which are elements that correct the spherical aberration.

By adopting such a configuration, information about which information layer of the given multilayer optical disc the focus position is currently located closest to can be obtained and the spherical aberration correction can be quickly optimized in accordance with that information. That is why the magnitude of spherical aberration correction can be changed exactly when the focus position crosses an information layer after the focus jump operation has been started.

Optionally, the time interval between the S-curve signals may be measured as described above to calculate the shift velocity of the focus position, and then the location of the layer that the focus position has gotten to (i.e., the point where the spherical aberration is currently produced) may be estimated.

FIG. 22 is a timing diagram showing how the CPU 146 measures the time interval between the S-curve signals while a focus jump operation is being carried out, calculates the shift velocity based on that interval, and then feeds back a signal representing that velocity to the actuator in the spherical aberration correcting section 128.

In this case, since the layer pitch and the S-curve detection range are already known, the shift velocity of the focus position can be estimated. Thus, it can be calculated easily how far the focus position of the light beam has gone as a result of the focus jump. In this manner, it can be seen which information layer the focus position is now accessing or on which information layer the focus position is currently located. Consequently, the magnitude of spherical aberration correction to make can be sequentially adjusted to one information layer after another, to which the focus position is now shifting.

As can be seen, the interval of detection of S-curve signals is proportional to the shift velocity of the focus position. That is why it is possible to synchronize a time when the focus position crosses an information layer with a time when the spherical aberration correction is made adaptively to the information layer crossed by the focus position.

If the optical disc apparatus with such a configuration makes a layer-to-layer jump as shown in FIG. 14, the S-curve signals obtained from the L1 through L4 layers will have sufficiently great amplitudes that are roughly equal to each other.

In the example illustrated in FIG. 14, the acceleration pulse P1 and the deceleration pulse are supposed to be output only once apiece. However, as can be seen from FIG. 22, the present invention is in no way limited to that specific preferred embodiment.

In each of the preferred embodiments of the present invention described above, a minimum spherical aberration correction is supposed to be made on the braking layer. However, even if the spherical aberration correction is made so as to minimize the spherical aberration at the target information layer but if the braking layer is adjacent to the target information layer, an S-curve signal can also be detected highly accurately from the braking layer.

For that reason, an optical disc apparatus according to another preferred embodiment of the present invention may include a layer-to-layer jump control section for controlling a layer-to-layer jump of a focus position from one of multiple information layers, which are stacked in a multilayer optical disc, to another, and an S-curve signal detecting section for detecting an S-curve signal from the previous information layer that is located shallower than, and adjacent to, the target information layer of the layer-to-layer jump that has been started. The layer-to-layer jump control section may start to decrease the shift velocity of the focus position during the layer-to-layer jump in response to the S-curve signal which is detected and may decrease the shift velocity most significantly at the previous information layer that is located shallower than, and adjacent to, the target information layer.

Such an optical disc apparatus can perform a layer-to-layer jumping method for controlling a layer-to-layer jump of a focus position from one of multiple information layers, which are stacked in a multilayer optical disc, to another. Specifically, the method may include the steps of: detecting an S-curve signal from the previous information layer that is located shallower than, and adjacent to, the target information layer of the layer-to-layer jump that has been started; and starting to decrease the shift velocity of the focus position during the layer-to-layer jump in response to the S-curve signal which is detected and decreasing the shift velocity most significantly at the previous information layer that is located shallower than, and adjacent to, the target information layer.

Such an optical disc apparatus or layer-to-layer jumping method can stop the layer-to-layer jump at the target information layer more safely than a situation where an S-curve signal is detected from the target information layer.

Industrial Applicability

As described above, according to the optical disc apparatus and multilayer optical disc layer-to-layer jumping method of the present invention, the focus position can be shifted quickly from one layer to another with good stability. That is why the present invention can be used effectively in a multilayer optical disc with three or more information layers.

The present invention is applicable to not just BDs but also any other type of optical discs (such as CH-DVD) as long as multiple information layers are stacked one upon the other in that optical disc. Furthermore, the present invention is naturally effectively applicable to recorders or PC drives with a data writing function, as well as players with no video recording functions.

Reference Signs List
100 optical disc
103 optical pickup
106 servo controller
146 layer-to-layer jump control section (CPU)
160 S-curve signal detecting section

The invention claimed is:

1. An optical disc apparatus comprising:
   a layer-to-layer jump control section for controlling a layer-to-layer jump of a focus position from one of multiple information layers, which are stacked in a multilayer optical disc, to another, the multilayer optical disc comprising at least four information layers;
   a spherical aberration correcting section having the ability to make a spherical aberration correction adaptively to each of the multiple information layers in the optical disc; and
   an S-curve signal detecting section for detecting an S-curve signal from any of the information layers after the layer-to-layer jump of the focus position has been started,
   wherein the spherical aberration correcting section makes a spherical aberration correction to set the value of the S-curve signal of an intermediate layer to be larger than the value of the S-curve signal of the information layer at which the focus position was located when the layer-to-layer jump was started and the target information layer of the layer-to-layer jump, the intermediate layer being one of the two information layers that are adjacent to the target information layer, and the two information layers being between the information layer at which the focus position was located when the layer-to-layer jump was started and the target information layer,
   wherein in response to the S-curve signal which is detected from the intermediate layer, the layer-to-layer jump control section starts to decrease the shift velocity of the focus position during the layer-to-layer jump.

2. The optical disc apparatus of claim 1, wherein the intermediate layer is adjacent to the target information layer of the layer-to-layer jump.

3. The optical disc apparatus of claim 1, wherein before the layer-to-layer jump is started, the spherical aberration correcting section gets the spherical aberration correction done adaptively to the intermediate layer.

4. The optical disc apparatus of claim 1, wherein after the layer-to-layer jump has been started, the layer-to-layer jump control section adaptively increases or decreases the shift velocity of the focus position according to the interval at which S-curve signals are detected when the focus position crosses the respective information layers.

5. The optical disc apparatus of claim 1, the spherical aberration correcting section comprises a spherical aberration correction lens and a stepping motor for driving the spherical aberration correction lens.

6. The optical disc apparatus of claim 1, wherein the spherical aberration correcting section maximizes the value of the S-curve signal of the intermediate layer by minimizing the spherical aberration of the intermediate layer.

7. A layer-to-layer jumping method for controlling the layer-to-layer jump of a focus position from one of multiple information layers, which are stacked in a multilayer optical disc, to another, the multilayer optical disc comprising at least four information layers, the method comprising the steps of:
making a spherical aberration correction to set a value of an S-curve signal of an intermediate layer to be larger than a value of an S-curve signal of the information layer at which the focus position was located when the layer-to-layer jump was started and the target information layer of the layer-to-layer jump, the intermediate layer being one of the two information layers that are adjacent to the target information layer, and the two information layers being between the information layer at which the focus position was located when the layer-to-layer jump was started and the target information layer;
detecting the S-curve signal from the intermediate layer after having started the layer-to-layer jump; and
on detecting the S-curve signal from the intermediate layer, starting to decrease the shift velocity of the focus position during the layer-to-layer jump.

8. The multilayer optical disc layer-to-layer jumping method of claim 7, wherein the intermediate layer is the information layer adjacent to the target information layer of the layer-to-layer jump.

9. The multilayer optical disc layer-to-layer jumping method of claim 7, comprising the step of making an appropriate spherical aberration correction for the target information layer of the layer-to-layer jump after the shift velocity of the focus position has been decreased.

10. The multilayer optical disc layer-to-layer jumping method of claim 7, comprising the step of determining the pattern of the layer-to-layer jump by reference to information about the total number of layers included in the multilayer optical disc and layer-to-layer jump information including information about the starting point and the end point of the layer-to-layer jump.

11. The multilayer optical disc layer-to-layer jumping method of claim 10, wherein the pattern of the layer-to-layer jump includes at least one of the layer on which a spherical aberration correction needs to be made before the layer-to-layer jump is started, the layer for which a deceleration signal needs to be generated, and the maximum number of layers to jump at a time.

12. The multilayer optical disc layer-to-layer jumping method of claim 10, wherein the pattern of the layer-to-layer jump includes a pattern in which the focus position is shifted from the starting point to the end point of the layer-to-layer jump in multiple steps.

13. The multilayer optical disc layer-to-layer jumping method of claim 7, wherein S-curve signals detected from the respective information layers of the multilayer optical disc never overlap with each other.

14. The multilayer optical disc layer-to-layer jumping method of claim 7, wherein the layer-to-layer jump is performed differently depending on whether the layer-to-layer jump needs to be performed in a direction in which an objective lens accesses the multilayer optical disc or in a direction in which the objective lens goes away from the multilayer optical disc.

15. The multilayer optical disc layer-to-layer jumping method of claim 14, wherein when the layer-to-layer jump is performed in the direction in which the objective lens accesses the multilayer optical disc, the focus position being shifted crosses a smaller number of information layers than a situation where the layer-to-layer jump is performed in the direction in which the objective lens goes away from the multilayer optical disc.

16. The multilayer optical disc layer-to-layer jumping method of claim 7, wherein the making a spherical aberration correction comprises maximizing the value of the S-curve signal of the intermediate layer by minimizing the spherical aberration of the intermediate layer.

17. An optical disc apparatus comprising:
a layer-to-layer jump control section for controlling a layer-to-layer jump of a focus position from one of multiple information layers, which are stacked in a multilayer optical disc, to another, the multilayer optical disc comprising at least three information layers in which a first information layer, a second information layer, and a third information layer are stacked in this order;
a spherical aberration correcting section having the ability to make a spherical aberration correction adaptively to each of the multiple information layers in the optical disc; and
an S-curve signal detecting section for detecting an S-curve signal from any of the information layers after the layer-to-layer jump of the focus position has been started,
wherein, when the layer-to-layer jump is to be made from the first information layer to the third information layer, the spherical aberration correcting section makes a spherical aberration correction to set the value of the S-curve signal of the second information layer to be larger than the value of the S-curve signal of first and third information layers,
wherein in response to the S-curve signal which is detected from the second information layer, the layer-to-layer jump control section starts to decrease the shift velocity of the focus position during the layer-to-layer jump.

18. A method for controlling the layer-to-layer jump of a focus position from one of multiple information layers, which are stacked in a multilayer optical disc, to another, the multilayer optical disc comprising at least three information layers in which a first information layer, a second information layer, and a third information layer are stacked in this order, the method comprising the steps of:
making a spherical aberration correction to set a value of an S-curve signal of the second information layer to be larger than the value of an S-curve signal of the first and third information layers, when the layer-to-layer jump is to be made from the first information layer to the third information layer.
detecting the S-curve signal from the second information layer after having started the layer-to-layer jump; and
on detecting the S-curve signal from the second information layer, starting to decrease the shift velocity of the focus position during the layer-to-layer jump.

* * * * *